(12) United States Patent
Shim et al.

(10) Patent No.: US 11,734,712 B2
(45) Date of Patent: Aug. 22, 2023

(54) ATTRIBUTING IN-STORE VISITS TO MEDIA CONSUMPTION BASED ON DATA COLLECTED FROM USER DEVICES

(71) Applicant: FOURSQUARE LABS, INC., New York, NY (US)

(72) Inventors: David Shim, Seattle, WA (US); Elliott Waldron, Seattle, WA (US); Weilie Yi, Carlsbad, CA (US); Nick Gerner, Seattle, WA (US); George Varghese, Kirkland, WA (US); Andrea Eatherly, New York, NY (US)

(73) Assignee: FOURSQUARE LABS, INC., New York, NY (US)

( * ) Notice: Subject to any disclaimer, the term of this patent is extended or adjusted under 35 U.S.C. 154(b) by 459 days.

(21) Appl. No.: 14/825,978

(22) Filed: Aug. 13, 2015

(65) Prior Publication Data
US 2016/0048869 A1   Feb. 18, 2016

Related U.S. Application Data

(60) Provisional application No. 62/037,025, filed on Aug. 13, 2014.

(51) Int. Cl.
*G06Q 30/00* (2023.01)
*G06Q 30/0242* (2023.01)

(52) U.S. Cl.
CPC .................. *G06Q 30/0246* (2013.01)

(58) Field of Classification Search
None
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| EP | 2051480 A1 | 4/2009 |

(Continued)

OTHER PUBLICATIONS

Gregorich et al., "Verification of AIRS Boresight Accuracy Using Coastline Detection" IEEE Transactions on Geoscience and Remote Sensing, vol. 41, Issue 2, (2003) pp. 298-302.

(Continued)

*Primary Examiner* — Meredith A Long

(57) ABSTRACT

A system and method for attributing in-store visits to exposure to advertisement ("ad") impressions associated with an ad campaign are disclosed. The system gathers impression data and uses that data to identify users who were exposed to the ad impressions. The system then uses location data, activity information and in some instances beacon data points reported by mobile devices of the impression users to determine if the impression users visited a target place during a conversion window. Based on the impression users who were exposed to the ad impressions, the system establishes a control group of users who were not exposed to the ad impressions to perform quasi-experimental analyses to assess whether the ad impressions had any impact on changing the impression users' physical in-store visitation behavior.

9 Claims, 32 Drawing Sheets

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,485 B1 | 9/2002 | Anzil |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,966,658 B2 | 6/2011 | Singh et al. |
| 8,001,204 B2 | 8/2011 | Burtner et al. |
| 8,010,685 B2 | 8/2011 | Singh et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,200,247 B1 | 6/2012 | Starenky et al. |
| 8,208,943 B2 | 6/2012 | Petersen |
| 8,214,443 B2 | 7/2012 | Hamburg |
| 8,220,034 B2 | 7/2012 | Hahn et al. |
| 8,229,458 B2 | 7/2012 | Busch |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind |
| 8,285,199 B2 | 10/2012 | Hsu et al. |
| 8,287,380 B2 | 10/2012 | Nguyen et al. |
| 8,296,842 B2 | 10/2012 | Singh et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,509,761 B2 | 8/2013 | Krinsky et al. |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,588,942 B2 | 11/2013 | Agrawal |
| 8,594,680 B2 | 11/2013 | Ledlie et al. |
| 8,613,088 B2 | 12/2013 | Varghese et al. |
| 8,613,089 B1 | 12/2013 | Holloway et al. |
| 8,660,358 B1 | 2/2014 | Bergboer et al. |
| 8,660,369 B2 | 2/2014 | Llano et al. |

(56) References Cited

U.S. PATENT DOCUMENTS

| | | | |
|---|---|---|---|
| 8,660,793 | B2 | 2/2014 | Ngo et al. |
| 8,682,350 | B2 | 3/2014 | Altman et al. |
| 8,688,524 | B1* | 4/2014 | Ramalingam .......... G06Q 20/20 |
| | | | 705/16 |
| 8,718,333 | B2 | 5/2014 | Wolf et al. |
| 8,724,622 | B2 | 5/2014 | Rojas |
| 8,732,168 | B2 | 5/2014 | Johnson |
| 8,744,523 | B2 | 6/2014 | Fan et al. |
| 8,745,132 | B2 | 6/2014 | Obradovich |
| 8,761,800 | B2 | 6/2014 | Kuwahara |
| 8,768,876 | B2 | 7/2014 | Shim et al. |
| 8,775,972 | B2 | 7/2014 | Spiegel |
| 8,788,680 | B1 | 7/2014 | Naik |
| 8,790,187 | B2 | 7/2014 | Walker et al. |
| 8,797,415 | B2 | 8/2014 | Arnold |
| 8,798,646 | B1 | 8/2014 | Wang et al. |
| 8,856,349 | B2 | 10/2014 | Jain et al. |
| 8,874,677 | B2 | 10/2014 | Rosen et al. |
| 8,886,227 | B2 | 11/2014 | Schmidt et al. |
| 8,909,679 | B2 | 12/2014 | Roote et al. |
| 8,909,725 | B1 | 12/2014 | Sehn |
| 8,942,953 | B2 | 1/2015 | Yuen et al. |
| 8,972,357 | B2 | 3/2015 | Shim et al. |
| 8,995,433 | B2 | 3/2015 | Rojas |
| 9,015,285 | B1 | 4/2015 | Ebsen et al. |
| 9,020,745 | B2 | 4/2015 | Johnston et al. |
| 9,040,574 | B2 | 5/2015 | Wang et al. |
| 9,055,416 | B2 | 6/2015 | Rosen et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,113,301 | B1 | 8/2015 | Spiegel et al. |
| 9,119,027 | B2 | 8/2015 | Sharon et al. |
| 9,123,074 | B2 | 9/2015 | Jacobs |
| 9,143,382 | B2 | 9/2015 | Bhogal et al. |
| 9,143,681 | B1 | 9/2015 | Ebsen et al. |
| 9,152,477 | B1 | 10/2015 | Campbell et al. |
| 9,191,776 | B2 | 11/2015 | Root et al. |
| 9,204,252 | B2 | 12/2015 | Root |
| 9,225,897 | B1 | 12/2015 | Sehn et al. |
| 9,256,832 | B2 | 2/2016 | Shim et al. |
| 9,258,459 | B2 | 2/2016 | Hartley |
| 9,344,606 | B2 | 5/2016 | Hartley et al. |
| 9,385,983 | B1 | 7/2016 | Sehn |
| 9,396,354 | B1 | 7/2016 | Murphy et al. |
| 9,407,712 | B1 | 8/2016 | Sehn |
| 9,407,816 | B1 | 8/2016 | Sehn |
| 9,430,783 | B1 | 8/2016 | Sehn |
| 9,439,041 | B2 | 9/2016 | Parvizi et al. |
| 9,443,227 | B2 | 9/2016 | Evans et al. |
| 9,450,907 | B2 | 9/2016 | Pridmore et al. |
| 9,459,778 | B2 | 10/2016 | Hogeg et al. |
| 9,489,661 | B2 | 11/2016 | Evans et al. |
| 9,491,134 | B2 | 11/2016 | Rosen et al. |
| 9,532,171 | B2 | 12/2016 | Allen et al. |
| 9,537,811 | B2 | 1/2017 | Allen et al. |
| 9,628,950 | B1 | 4/2017 | Noeth et al. |
| 9,710,821 | B2 | 7/2017 | Heath |
| 9,854,219 | B2 | 12/2017 | Sehn |
| 2002/0047868 | A1 | 4/2002 | Miyazawa |
| 2002/0078456 | A1 | 6/2002 | Hudson et al. |
| 2002/0087631 | A1 | 7/2002 | Sharma |
| 2002/0097257 | A1 | 7/2002 | Miller et al. |
| 2002/0122659 | A1 | 9/2002 | Mcgrath et al. |
| 2002/0128047 | A1 | 9/2002 | Gates |
| 2002/0144154 | A1 | 10/2002 | Tomkow |
| 2003/0001846 | A1 | 1/2003 | Davis et al. |
| 2003/0016247 | A1 | 1/2003 | Lai et al. |
| 2003/0017823 | A1 | 1/2003 | Mager et al. |
| 2003/0020623 | A1 | 1/2003 | Cao et al. |
| 2003/0023874 | A1 | 1/2003 | Prokupets et al. |
| 2003/0037124 | A1 | 2/2003 | Yamaura et al. |
| 2003/0052925 | A1 | 3/2003 | Daimon et al. |
| 2003/0101230 | A1 | 5/2003 | Benschoter et al. |
| 2003/0110503 | A1 | 6/2003 | Perkes |
| 2003/0126215 | A1 | 7/2003 | Udell |
| 2003/0148773 | A1 | 8/2003 | Spriestersbach et al. |
| 2003/0164856 | A1 | 9/2003 | Prager et al. |
| 2003/0229607 | A1 | 12/2003 | Zellweger et al. |
| 2004/0027371 | A1 | 2/2004 | Jaeger |
| 2004/0064429 | A1 | 4/2004 | Hirstius et al. |
| 2004/0078367 | A1 | 4/2004 | Anderson et al. |
| 2004/0111467 | A1 | 6/2004 | Willis |
| 2004/0158739 | A1 | 8/2004 | Wakai et al. |
| 2004/0189465 | A1 | 9/2004 | Capobianco et al. |
| 2004/0203959 | A1 | 10/2004 | Coombes |
| 2004/0215625 | A1 | 10/2004 | Svendsen et al. |
| 2004/0243531 | A1 | 12/2004 | Dean |
| 2004/0243688 | A1 | 12/2004 | Wugofski |
| 2005/0021444 | A1 | 1/2005 | Bauer et al. |
| 2005/0022211 | A1 | 1/2005 | Veselov et al. |
| 2005/0048989 | A1 | 3/2005 | Jung |
| 2005/0071218 | A1* | 3/2005 | Lin ....................... G06Q 30/00 |
| | | | 705/14.44 |
| 2005/0078804 | A1 | 4/2005 | Yomoda |
| 2005/0097176 | A1 | 5/2005 | Schatz et al. |
| 2005/0102381 | A1 | 5/2005 | Jiang et al. |
| 2005/0104976 | A1 | 5/2005 | Currans |
| 2005/0114783 | A1 | 5/2005 | Szeto |
| 2005/0119936 | A1 | 6/2005 | Buchanan et al. |
| 2005/0122405 | A1 | 6/2005 | Voss et al. |
| 2005/0193340 | A1 | 9/2005 | Amburgey et al. |
| 2005/0193345 | A1 | 9/2005 | Klassen et al. |
| 2005/0198128 | A1 | 9/2005 | Anderson |
| 2005/0223066 | A1 | 10/2005 | Buchheit et al. |
| 2005/0288954 | A1 | 12/2005 | McCarthy et al. |
| 2006/0026067 | A1 | 2/2006 | Nicholas et al. |
| 2006/0107297 | A1 | 5/2006 | Toyama et al. |
| 2006/0114338 | A1 | 6/2006 | Rothschild |
| 2006/0119882 | A1 | 6/2006 | Harris et al. |
| 2006/0230141 | A1* | 10/2006 | Willis ..................... A63F 13/12 |
| | | | 709/224 |
| 2006/0242239 | A1 | 10/2006 | Morishima et al. |
| 2006/0252438 | A1 | 11/2006 | Ansamaa et al. |
| 2006/0265417 | A1 | 11/2006 | Amato et al. |
| 2006/0270419 | A1 | 11/2006 | Crowley et al. |
| 2006/0287878 | A1 | 12/2006 | Wadhwa et al. |
| 2007/0004426 | A1 | 1/2007 | Pfleging et al. |
| 2007/0038715 | A1 | 2/2007 | Collins et al. |
| 2007/0040931 | A1 | 2/2007 | Nishizawa |
| 2007/0073517 | A1 | 3/2007 | Panje |
| 2007/0073823 | A1 | 3/2007 | Cohen et al. |
| 2007/0075898 | A1 | 4/2007 | Markhovsky et al. |
| 2007/0082707 | A1 | 4/2007 | Flynt et al. |
| 2007/0136228 | A1 | 6/2007 | Petersen |
| 2007/0192128 | A1 | 8/2007 | Celestini |
| 2007/0198340 | A1 | 8/2007 | Lucovsky et al. |
| 2007/0198495 | A1 | 8/2007 | Buron et al. |
| 2007/0208751 | A1 | 9/2007 | Cowan et al. |
| 2007/0210936 | A1 | 9/2007 | Nicholson |
| 2007/0214180 | A1 | 9/2007 | Crawford |
| 2007/0214216 | A1 | 9/2007 | Carrer et al. |
| 2007/0233556 | A1 | 10/2007 | Koningstein |
| 2007/0233801 | A1 | 10/2007 | Eren et al. |
| 2007/0233859 | A1 | 10/2007 | Zhao et al. |
| 2007/0243887 | A1 | 10/2007 | Bandhole et al. |
| 2007/0244633 | A1 | 10/2007 | Phillips et al. |
| 2007/0244750 | A1 | 10/2007 | Grannan et al. |
| 2007/0255456 | A1 | 11/2007 | Funayama |
| 2007/0281690 | A1 | 12/2007 | Altman et al. |
| 2008/0022329 | A1 | 1/2008 | Glad |
| 2008/0025701 | A1 | 1/2008 | Ikeda |
| 2008/0032703 | A1 | 2/2008 | Krumm et al. |
| 2008/0033930 | A1 | 2/2008 | Warren |
| 2008/0043041 | A2 | 2/2008 | Hedenstroem et al. |
| 2008/0049704 | A1 | 2/2008 | Witteman et al. |
| 2008/0062141 | A1 | 3/2008 | Chandhri |
| 2008/0076505 | A1 | 3/2008 | Ngyen et al. |
| 2008/0092233 | A1 | 4/2008 | Tian et al. |
| 2008/0094387 | A1 | 4/2008 | Chen |
| 2008/0104503 | A1 | 5/2008 | Beall et al. |
| 2008/0109844 | A1 | 5/2008 | Baldeschweiler et al. |
| 2008/0120409 | A1 | 5/2008 | Sun et al. |
| 2008/0147730 | A1 | 6/2008 | Lee et al. |

(56) References Cited

U.S. PATENT DOCUMENTS

| | | |
|---|---|---|
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0089558 A1 | 4/2009 | Bradford et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0204354 A1 | 8/2009 | Davis et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0276235 A1 | 11/2009 | Benezra et al. |
| 2009/0278738 A1 | 11/2009 | Gopinath |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0041378 A1 | 2/2010 | Aceves et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0153216 A1* | 6/2010 | Liang ............... G06Q 30/02 705/14.57 |
| 2010/0159944 A1 | 6/2010 | Pascal et al. |
| 2010/0161658 A1 | 6/2010 | Hamynen et al. |
| 2010/0161720 A1 | 6/2010 | Colligan et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0211425 A1 | 8/2010 | Govindarajan |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0223346 A1 | 9/2010 | Dragt |
| 2010/0250109 A1 | 9/2010 | Johnston et al. |
| 2010/0257036 A1 | 10/2010 | Khojastepour et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0076653 A1 | 3/2011 | Culligan et al. |
| 2011/0083101 A1 | 4/2011 | Sharon et al. |
| 2011/0099046 A1 | 4/2011 | Weiss et al. |
| 2011/0099047 A1 | 4/2011 | Weiss et al. |
| 2011/0099048 A1 | 4/2011 | Weiss et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215903 A1 | 9/2011 | Yang et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0270673 A1* | 11/2011 | Lin .................. G06Q 30/02 705/14.45 |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |

(56) References Cited

U.S. PATENT DOCUMENTS

| | | |
|---|---|---|
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0143760 A1 | 6/2012 | Abulafia et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0246004 A1 | 9/2012 | Book et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0264446 A1 | 10/2012 | Xie et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0225202 A1 | 8/2013 | Shim et al. |
| 2013/0226857 A1 | 8/2013 | Shim et al. |
| 2013/0227476 A1 | 8/2013 | Frey |
| 2013/0232194 A1 | 9/2013 | Knapp et al. |
| 2013/0254227 A1 | 9/2013 | Shim et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0278934 A1* | 9/2014 | Gutierrez .......... G06Q 30/0246 705/14.45 |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0304212 A1 | 10/2014 | Shim et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0088635 A1* | 3/2015 | Maycotte .......... G06Q 30/0244 705/14.43 |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |

(56) References Cited

U.S. PATENT DOCUMENTS

| | | | |
|---|---|---|---|
| 2015/0172534 A1 | 6/2015 | Miyakawaa et al. | |
| 2015/0178260 A1 | 6/2015 | Brunson | |
| 2015/0222814 A1 | 8/2015 | Li et al. | |
| 2015/0261917 A1 | 9/2015 | Smith | |
| 2015/0312184 A1 | 10/2015 | Langholz et al. | |
| 2015/0348095 A1* | 12/2015 | Dixon | G06Q 30/0246 705/14.45 |
| 2015/0350136 A1 | 12/2015 | Flynn, III et al. | |
| 2015/0365795 A1 | 12/2015 | Allen et al. | |
| 2015/0378502 A1 | 12/2015 | Hu et al. | |
| 2016/0006927 A1 | 1/2016 | Sehn | |
| 2016/0014063 A1 | 1/2016 | Hogeg et al. | |
| 2016/0078485 A1 | 3/2016 | Shim et al. | |
| 2016/0085773 A1 | 3/2016 | Chang et al. | |
| 2016/0085863 A1 | 3/2016 | Allen et al. | |
| 2016/0099901 A1 | 4/2016 | Allen et al. | |
| 2016/0157062 A1 | 6/2016 | Shim et al. | |
| 2016/0180887 A1 | 6/2016 | Sehn | |
| 2016/0182422 A1 | 6/2016 | Sehn et al. | |
| 2016/0182875 A1 | 6/2016 | Sehn | |
| 2016/0239248 A1 | 8/2016 | Sehn | |
| 2016/0277419 A1 | 9/2016 | Allen et al. | |
| 2016/0321708 A1 | 11/2016 | Sehn | |
| 2017/0006094 A1 | 1/2017 | Abou Mahmoud et al. | |
| 2017/0061308 A1 | 3/2017 | Chen et al. | |
| 2017/0287006 A1 | 10/2017 | Azmoodeh et al. | |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

Hsu-Yang Kun et al., "Using RFID Technology and SOA with 4D Escape Route" Wireless Communications, Networking and Mobile Computing (2008) pp. 1-4.

Ning Xia et al., "GeoEcho: Inferring User Interests from Geotag Reports in Network Traffic" IEEE/WIC/ACM International Joint Conferences, vol. 2 (2014) pp. 1-8.

"A Whole New Story", URL: https://www.snap.com/en-US/news/, (2017), 13 pgs.

"Adding a watermark to your photos", eBay, URL: http://pages.ebay.com/help/sell/pictures.html, (accessed May 24, 2017), 4 pgs.

"BlogStomp", URL: http://stompsoftware.com/blogstomp, (accessed May 24, 2017), 12 pgs.

"Cup Magic Starbucks Holiday Red Cups come to life with AR app", URL: http://www.blastradius.com/work/cup-magic, (2016), 7 pgs.

"Daily App: InstaPlace (iOS/Android): Give Pictures a Sense of Place", TechPP, URL: http://techpp.com/2013/02/15/instaplace-app-review, (2013), 13 pgs.

"InstaPlace Photo App Tell The Whole Story", URL: https://youtu.be/uF_gFkg1hBM, (Nov. 8, 2013), 113 pgs.

"International Application Serial No. PCT/US2015/037251, International Search Report dated Sep. 29, 2015", 2 pgs.

"Introducing Snapchat Stories", URL: https://www.youtube.com/watch?v=88Cu3yN-LIM, (Oct. 3, 2013), 92 pgs.

"Macy's Believe-o-Magic", URL: https://www.youtube.com/watch?v=xvzRXy3J0Z0, (Nov. 7, 2011), 102 pgs.

"Macys Introduces Augmented Reality Experience in Stores across Country as Part of Its 2011 Believe Campaign", URL: https://www.businesswire.com/news/home/20111102006759/en/Macys-Introduces-Augmented-Reality-Experience-Stores-Country, (Nov. 2, 2011), 6 pgs.

"Starbucks Cup Magic", URL: https://www.youtube.com/watch?v=RWwQXi9RGOw, (Nov. 8, 2011), 87 pgs.

"Starbucks Cup Magic for Valentine's Day", URL: https://www.youtube.com/watch?v=8nvqOzjq10w, (Feb. 6, 2012), 88 pgs.

"Starbucks Holiday Red Cups Come to Life, Signaling the Return of the Merriest Season", URL: http://www.businesswire.com/news/home/20111115005744/en/2479513/Starbucks-Holiday-Red-Cups-Life-Signaling-Return, (Nov. 15, 2011), 5 pgs.

Carthy, Roi, "Dear All Photo Apps: Mobli Just Won Filters", URL: https://techcrunch.com/2011/09/08/mobli-filters, (Sep. 8, 2011), 10 pgs.

Janthong, Isaranu, "Android App Review Thailand", URL: http://www.android-free-app-review.com/2013/01/instaplace-android-google-play-store.html, (Jan. 23, 2013), 9 pgs.

Macleod, Duncan, "Macys Believe-o-Magic App", URL: http://theinspirationroom.com/daily/2011/macys-believe-o-magic-app, (Nov. 14, 2011), 10 pgs.

Macleod, Duncan, "Starbucks Cup Magic Lets Merry", URL: http://theinspirationroom.com/daily/2011/starbucks-cup-magic, (Nov. 12, 2011), 8 pgs.

Notopoulos, Katie, "A Guide To The New Snapchat Filters And Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.

Panzarino, Matthew, "Snapchat Adds Filters, A Replay Function And For Whatever Reason, Time, Temperature And Speed Overlays", URL: https://techcrunch.com/2013/12/20/snapchat-adds-filters-new-font-and-for-some-reason-time-temperature-and-speed-overlays/, (Dec. 20, 2013), 12 pgs.

Tripathi, Rohit, "Watermark Images in PHP And Save File on Server", URL: http://code.rohitink.com/2012/12/28/watermark-images-in-php-and-save-file-on-server, (Dec. 28, 2012), 4 pgs.

* cited by examiner

Geography

| FEATURE | | IMPRESSION INDEX |
|---|---|---|
| 1 | Alexandria | 245 |
| 2 | Wheeling et al. | 231 |
| 3 | Ft. Wayne | 202 |

| FEATURE | | PLACE INDEX |
|---|---|---|
| 1 | Sacramento et al. | 675 |
| 2 | Oklahoma City | 269 |
| 3 | Jacksonville | 268 |

*FIG. 7*

Advertiser: HMC

Campaign: HMC Sales Report – Combined Report

Flight: 02/14/14 – 05/26/14

Conversion: Visits to HMC

---

Campaign Metrics

| 9,341,017 | $145,000 | 1,952 | 1.4 |
|---|---|---|---|
| Impressions | Ad Spend | Panelists w/Ad Impression | Impressions Per Panelist |

---

Store Visits

117,215   =   1.72%   X   6,814,954

Projected Store Visits – 30 days     Store Conv. Rate     Projected Campaign Reach $1.24

Cost Per Store Visit

---

Lift – Standard   Confidence 69.72%

10.44%   =   1,72%   /   1.56%

Lift     Exposed – Store Conversion Rate     Unexposed – Store Conversion Rate 11,081     $13.09

Projected Lift Store Visits     Cost Per Lift Store Visit

*FIG. 25*

Demographics

 Gender

| FEATURE | | IMPRESSION INDEX | PLACE INDEX |
|---|---|---|---|
| 1 | Female | 122 | 131 |
| 2 | Male | 63 | -- |

 Age

| FEATURE | | IMPRESSION INDEX | PLACE INDEX |
|---|---|---|---|
| 1 | 13 – 17 | 425 | -- |
| 2 | 18 – 24 | 187 | -- |
| 3 | 35 – 44 | 100 | -- |
| 4 | 54+ | 90 | -- |
| 5 | 25 – 34 | 72 | -- |

 Income

| FEATURE | | IMPRESSION INDEX | PLACE INDEX |
|---|---|---|---|
| 1 | < 25K | 132 | 153 |
| 2 | 25K – 50K | 65 | -- |
| 3 | 50K – 100K | 37 | -- |

 Children

| FEATURE | | IMPRESSION INDEX | PLACE INDEX |
|---|---|---|---|
| 1 | No | 105 | -- |
| 2 | Yes | 96 | -- |

 Relationship Status

| FEATURE | | IMPRESSION INDEX | PLACE INDEX |
|---|---|---|---|
| 1 | Single | 127 | 130 |
| 2 | Married | 43 | -- |

 Ethnicity

| FEATURE | | IMPRESSION INDEX | PLACE INDEX |
|---|---|---|---|
| 1 | Asian | 162 | -- |
| 2 | Caucasian | 119 | 129 |
| 3 | Hispanic | 90 | -- |
| 4 | Other | 86 | -- |
| 5 | African American | 54 | -- |

 Education

| FEATURE | | IMPRESSION INDEX | PLACE INDEX |
|---|---|---|---|
| 1 | No College | 131 | -- |
| 2 | College | 91 | 100 |

*FIG. 26A*

Geography
| FEATURE | | | IMPRESSION INDEX |
|---|---|---|---|
| 1 |  | Oregon | 181 |
| 2 |  | Sacramento et al. | 151 |
| 3 |  | Nevada | 143 |
| 4 |  | Seattle-Tacoma | 141 |
| 5 |  | Washington | 135 |
| 6 |  | West | 132 |
| 7 |  | Boston et al. | 131 |
| 8 |  | California | 127 |
| 9 |  | Los Angeles | 123 |
| 10 |  | Alabama | 117 |
| 11 |  | Tennessee | 113 |
| 12 |  | Colorado | 113 |
| 13 |  | Indiana | 104 |
| 14 |  | Louisiana | 104 |
| 15 |  | North Carolina | 102 |
| 16 |  | Massachusetts | 101 |
| 17 |  | Mid West | 99 |
| 18 |  | Orlando et al. | 99 |
| 19 |  | Ohio | 92 |
| 20 |  | Arizona | 92 |
*FIG. 26B*

Businesses

| FEATURE | | IMPRESSION INDEX |
|---|---|---|
| 1 | Hy-Vee | 207 |
| 2 | Fred Meyer | 163 |
| 3 | Papa Murphy's | 149 |
| 4 | Nordstrom | 148 |
| 5 | Victoria's Secret | 139 |
| 6 | Famous Footwear | 137 |
| 7 | American Eagle Outfitters | 137 |
| 8 | Red Robin | 135 |
| 9 | ampm | 130 |
| 10 | Jimmy John's | 126 |
| 11 | Dillard's | 126 |
| 12 | Jamba Juice | 125 |
| 13 | Anytime Fitness | 124 |
| 14 | Bath And Body Works | 122 |
| 15 | Cold Stone Creamery | 121 |
| 16 | Safeway | 120 |
| 17 | Sonic Drive-In | 120 |
| 18 | Target | 118 |
| 19 | Oreilly Auto Parts | 118 |
| 20 | Dick's Sporting Goods | 118 |

| FEATURE | | IMPRESSION INDEX |
|---|---|---|
| 1 | Nordstrom | 151 |
| 2 | Target | 63 |
| 3 | Walmart | 59 |
| 4 | 7-Eleven | 57 |
| 5 | Starbucks | 55 |
| 6 | Subway | 51 |
| 7 | McDonald's | 47 |

*FIG. 26C*

ATTRIBUTING IN-STORE VISITS TO MEDIA CONSUMPTION BASED ON DATA COLLECTED FROM USER DEVICES

CROSS-REFERENCE TO RELATED APPLICATIONS

This application claims priority to U.S. Provisional Patent Application No. 62/037,025, filed on Aug. 13, 2014, entitled ATTRIBUTING IN-STORE VISITS TO MEDIA CONSUMPTION BASED ON DATA COLLECTED FROM USER DEVICES, which is hereby incorporated by reference in its entirety. This application is related to U.S. application Ser. No. 13/405,182, filed Feb. 24, 2012, U.S. application Ser. No. 13/892,201, filed May 10, 2013, U.S. application Ser. No. 13/405,190, filed Feb. 24, 2012 (U.S. Pat. No. 8,768,876), and U.S. application Ser. No. 14/300,102, filed Jun. 9, 2014, which are hereby incorporated by reference in their entirety.

BACKGROUND

Advertisers utilize various media channels to advertise their products or services to consumers. In the online domain, for example, advertisers use emails and online advertisements ("ads") on websites and mobile applications. A consumer typically clicks on an online ad or an email to visit the advertiser's website, make a purchase on the website or download an application. As the consumption of the online ad and engagement in a desired behavior that the advertiser is interested in occurs on the same device, the advertiser is able to know, in general, if the online ad caused the consumer to engage in the desired behavior. However, when the consumption of an ad occurs in one device and the engagement in a desired behavior occurs in another device or offline, an advertiser generally does not have an effective way of knowing whether the ad had any impact on the consumer. In some instances, an advertiser can infer that an ad may have caused a consumer to make a purchase at the advertiser's store by reconciling a record of the purchase with an email address of the consumer. However, such a method can capture only "purchase" behavior. Consequently, the advertiser would not have any knowledge of the impact of the ad on the consumer if the consumer visited the store but did not purchase anything.

BRIEF DESCRIPTION OF THE DRAWINGS

FIG. 7 is a diagram illustrating example index metrics from indexing analyses.

FIGS. 25-26C are diagrams illustrating example attribution reports generated for an ad campaign.

DETAILED DESCRIPTION

Figure 1:
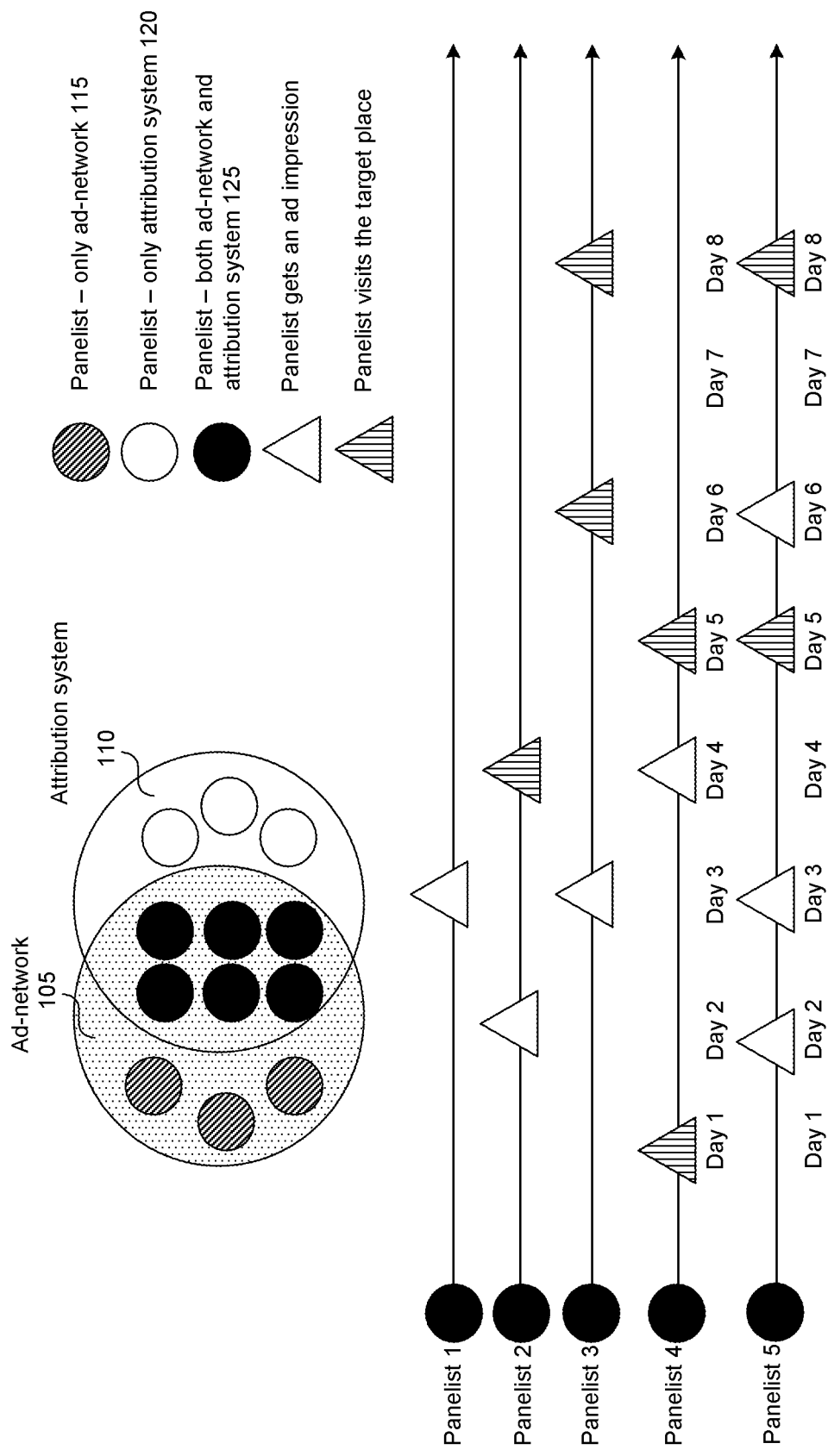
FIG. 1 is a diagram illustrating an embodiment of a target place visitation behavior of example panelists associated with both an ad-network and the attribution system.

The attribution system disclosed herein ties advertisement ("ad") impressions to visits to target places to provide advertisers one or more metrics characterizing the effectiveness of the ad impressions. Based on impression data associated with an ad campaign and geolocation data collected directly from a panel of mobile electronic device ("mobile device") users ("panelists"), the attribution system attributes a real-world, physical visit to a target place to exposure to the ad impression. In many instances, the attribution is a function of time elapsed between the exposure to the ad impression and the physical visit to the target place. A place, as used herein, includes any physical establishment, for example, a restaurant, a park, a store, a gas station, etc.

The attribution system, in some embodiments, leverages a data collection system to obtain user information, including location data, collected directly from the panelists. The data collection system obtains and validates location data from the panelists. The user information collected by the data collection system includes, for example, latitude, longitude, altitude determinations, sensor data (e.g., compass/bearing data, accelerometer or gyroscope measurements), and other information that can be used to identify a panelist's location and activity. Additional details on the data collection system can be found in U.S. patent application Ser. No. 13/405,182, which is hereby incorporated by reference in its entirety.

In some embodiments, the data collection system may receive, obtain, or access information from third party sources in order to enhance or modify attribution metrics for ad impressions. For example, a third party source of data, such as a payment processor or social network, may provide data confirming a purchase or use of a product or service associated with an ad impression. Such purchase or use information may, therefore, augment the data associated with an ad campaign and the geolocation data collected directly from the panel of mobile electronic device users.

In some embodiments, the attribution system may receive, obtain, or access information from third party sources in order to measure purchase data from a larger population of users, such as any users associated with a third party source. For example, the attribution system may utilize purchase or use data directly from the third party sources (e.g., data indicating a user or group of users made a purchase of a product or service at a certain location, via a certain retailer, and so on) as attribution for ad impressions.

The attribution system, in various embodiments, also leverages an inference pipeline that recognizes, based on location readings, whether a user visited a target place, and if so, determines the probability of the user at the target place and how much time the user spent at the target place. Additional details on the inference pipeline can be found in U.S. Pat. No. 8,768,876 which is also hereby incorporated by reference in its entirety.

In some embodiments, the process of attributing a visit to a target place starts with an advertiser (e.g., a mobile advertiser HMC) delivering ads (e.g., mobile ads, desktop ads, television ads) through an ad-network to a group of users on their devices (e.g., mobile devices, desktop computers, television, voice telephony, tablets, mobile gaming devices, smart phones) as part of an ad campaign. In other embodiments, ads may be delivered to, or accessed by, the group of users via other media types, such as via print, billboards, radio, and others described herein.

These users who receive the ad impressions form a campaign population. The advertiser or the ad-network provides impression data and details of the ad campaign to the attribution system. The impression data can include, for example, device identifiers, impression timestamps, targeting identifiers, and other metadata associated with the campaign or the target of the impression. For example, the metadata may include user agent strings and segment identifiers. The attribution system then uses the device identifier, IP address, device model, operating system version and/or any other metadata to match the campaign population against the panelists of the attribution system to identify panelists who were exposed to the ad impressions ("impression population"). In some embodiments, impression data can be collected by the attribution system.

After identifying the impression population based on the match, a baseline population is constructed in one of two ways. First, the advertiser may provide an indicator within the impression population that codes for membership in a control group (e.g., those impressions associated with no advertisement or the presentation of an unrelated advertisement). When no control group is specified, the attribution system identifies the panelists who did not match and includes them into a baseline or control group. The attribution system then performs experimental analysis to assess whether the ad impression had any impact on changing the impression users' physical store visitation behavior. In some embodiments, the attribution system can perform other analyses. For example, the attribution system can determine metrics such as costs per store visit, frequency of store visits, likelihood of store visits for different geography and demographics, or the like. These and other metrics from the analyses enable advertisers to make adjustments to their ad campaigns to improve performance (e.g., increase store visits, target certain demographics). The metrics generated by the attribution system also describe or characterize the nature of the ad campaign run by advertisers.

Various embodiments and implementations of the attribution system will now be described. The following description provides specific details for a thorough understanding and an enabling description of these embodiments and implementations. One skilled in the art will understand, however, that the embodiments and implementations may be practiced without many of these details. Additionally, some well-known structures or functions may not be shown or described in detail, so as to avoid unnecessarily obscuring the relevant description of the various embodiments and implementations. The terminology used in the description presented below is intended to be interpreted in its broadest reasonable manner, even though it is being used in conjunction with a detailed description of certain specific embodiments and implementations of the attribution system. It should be noted that although the present disclosure provides specific examples of analyses for attributing consumption of media (e.g., ads) to a physical store visitation, other analyses can be utilized by the attribution system for the same purpose. For example, any causal estimation techniques, regression analyses, etc. can be used by the attribution system to attribute consumption of media (e.g., ads) to a physical store visitation.

1. Overview

FIG. 1 is a diagram illustrating target place visitation behavior of four example panelists associated with an ad-network 105 and the attribution system 110. In FIG. 1, panelists 115 and 125 are associated with the ad-network 105 and receive an ad impression relating to an ad campaign. Panelists 120 and 125 are panelists of the attribution system 110. Some of the panelists of the attribution system (e.g., 120) receive no ad impressions, while other panelists (e.g., 125) of the attribution system match or overlap with the panelists of the ad-network and receive an ad impression relating to the ad campaign.

The attribution system analyses location and other activity information relating to panelists 125 of the attribution system who receive the ad impression over a window of time to determine or infer whether the panelists 125 visit a target place and probabilities of the visit. For example, the attribution system can determine or infer, based on location and/or other user information, that panelist 1 who receives an ad impression on day-3 does not visit the target place during the window of time (e.g., 5 days starting from the date of impression). Similarly, the attribution system can determine or infer that panelist 2 who receives an ad impression on day-2, visits the target place on day-4. In the case of panelist 3, he or she visits the target place on day-6 and day-8 after receiving an ad impression on day-3, while panelist 4 visits the target place 3 days before the ad impression and again one day after the ad-impression. The attribution system uses various models and analyses on the impression and baseline user impressions to determine if an exposure to ad impressions associated with the campaign caused the impression users to visit the target place during the window of time. In some embodiments, a multiple attribution method can be used to credit one or more impressions to a visit. For example, as illustrated in FIG. 1, panelist 5 receives an ad impression on day-2 and day-3 and visits the target place on day-5. Panelist 5 then sees an additional ad impression on day 6 and visits the target place on day-8. In this scenario, by using the multi attribution method, credit for the conversion (e.g., two visits to the target place) can be split across the ad impressions received on day-2, day-3 and day-6.

Thus, in some embodiments, the attribution system receives an indication that a mobile device has entered a target geographical location associated with a campaign, and determines a campaign impression for the campaign occurred at the mobile device within a certain time period before the mobile device entered the target location.

1a. Panelist Matching and Baseline Creation

Figure 2:
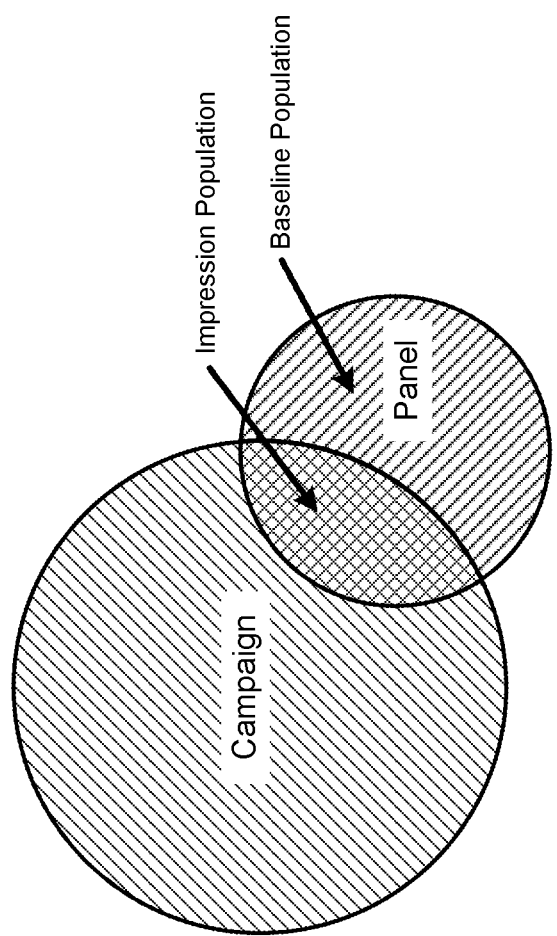
FIG. 2 is a block diagram illustrating panelist matching in the attribution system.

FIG. 2 is a block diagram illustrating panelist matching in the attribution system. The panelist matching is performed to identify panelists of the attribution system who were exposed to ads associated with an ad campaign. In various embodiments, matching is based on identifiers, for example, hashed device identifiers. The hashed device identifiers from the campaign population are matched against the hashed device identifiers of the panelist population. The overlap between the campaign population and the panelist population is the impression population.

In the case where no baseline or control group is provided by the advertiser, the population of nonmatching panelists forms the baseline population. The baseline population can be used as a basis for measuring the success of the ad campaign. Panelists in the baseline population are assigned simulated impression times in the same distribution as was observed in the impression population, unless the control group impression times are explicitly provided by the advertiser. Thereafter, the baseline population is analyzed in the same manner as the impression population with respect to the simulated impression times. When the control impression times are not provided by the advertiser, this process of randomly assigning simulated impression times to the baseline panelists ensures that any calendar seasonalities (e.g., weekday, end of month, time of day) effects are the same between the impression and baseline populations.

1b. Behavior Measurement

Figure 3:
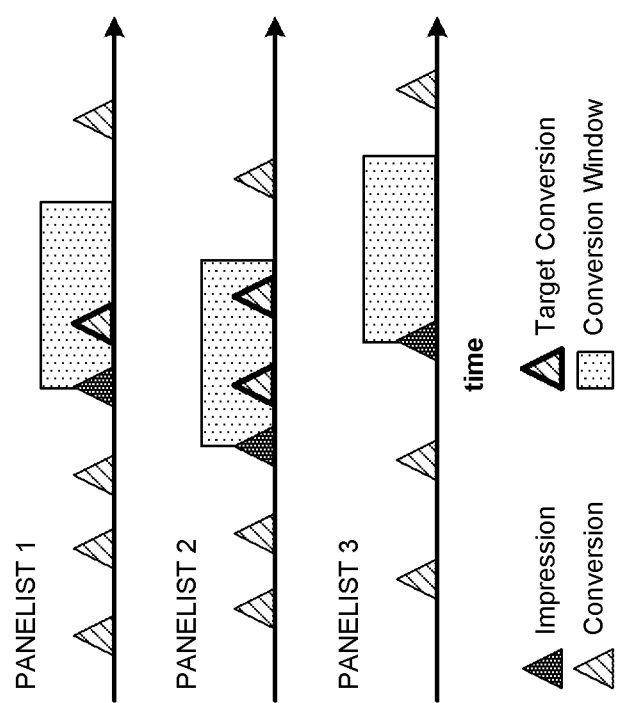
FIG. 3 is a diagram illustrating behavioral measurements of impression users of the attribution system.

The attribution system measures various metrics. One such metric is the in-store conversion rate (e.g., average number of visits across users) for the target place that was the focus of the ad campaign. This conversion rate is measured in the context of a conversion or time window. A conversion window is a window in time that starts just after the ad impression and ends as a later time. Different places can have different conversion windows. For example, a place that is visited weekly can have a 7-day conversion window (e.g., a grocery store), whereas a place that is usually visited on a monthly basis may have a 30 day conversion window (e.g., a mattress store). Conversion rates are computed over various widows in the period after the first impression or the most recent impression. The schematic of FIG. 3 depicts how conversions are captured in a conversion window for three example panelists. In FIG. 3, panelist 1 has one conversion event in the conversion window. Panelist 2 has two conversion events, and panelist 3 has no conversion events in the conversion window. In some embodiments, a multiple method can be used in calculating conversion rates. The multiple method weights the assignment across multiple ad impressions responsible for a visit.

1c. Propensity Scoring

Figure 4:
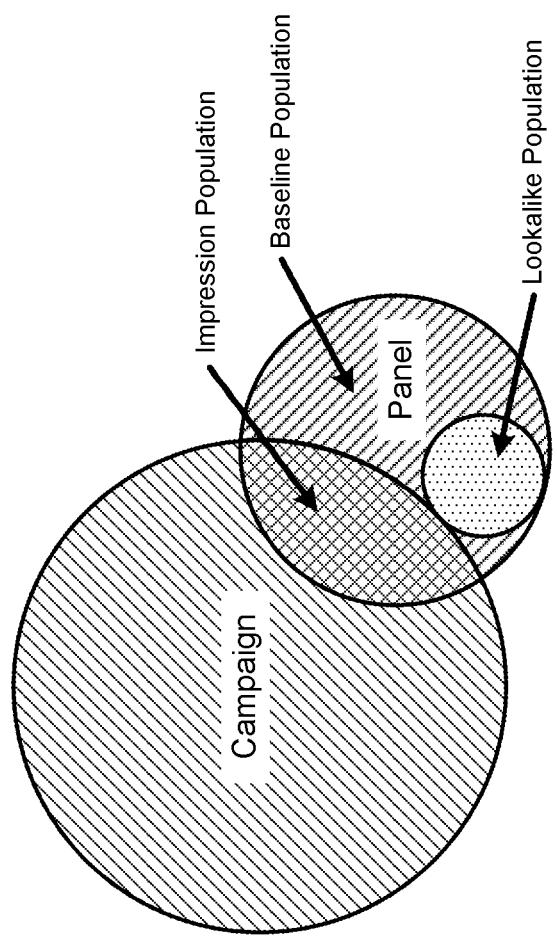
FIG. 4 is a diagram illustrating a lookalike population similar to the impression population carved out from the baseline population in the attribution system.

Often, an advertiser carries out an ad campaign to target a specific audience. For example, an ad for a retail pharmacy may be targeted to an older population (e.g., 50-65 year olds). When a control population is provided by the advertiser, measuring ad effectiveness is done by directly comparing conversion rates for the impression group and the baseline or control group. When the baseline is constructed from the population of non-matched panelists, the method of Propensity Scoring (or lookalike modeling) can be used to adjust the baseline population so that it looks like the impression population. FIG. 4 is a diagram that depicts the attribution system carving out a lookalike population in the baseline population that is similar to the impression population.

Figure 5:
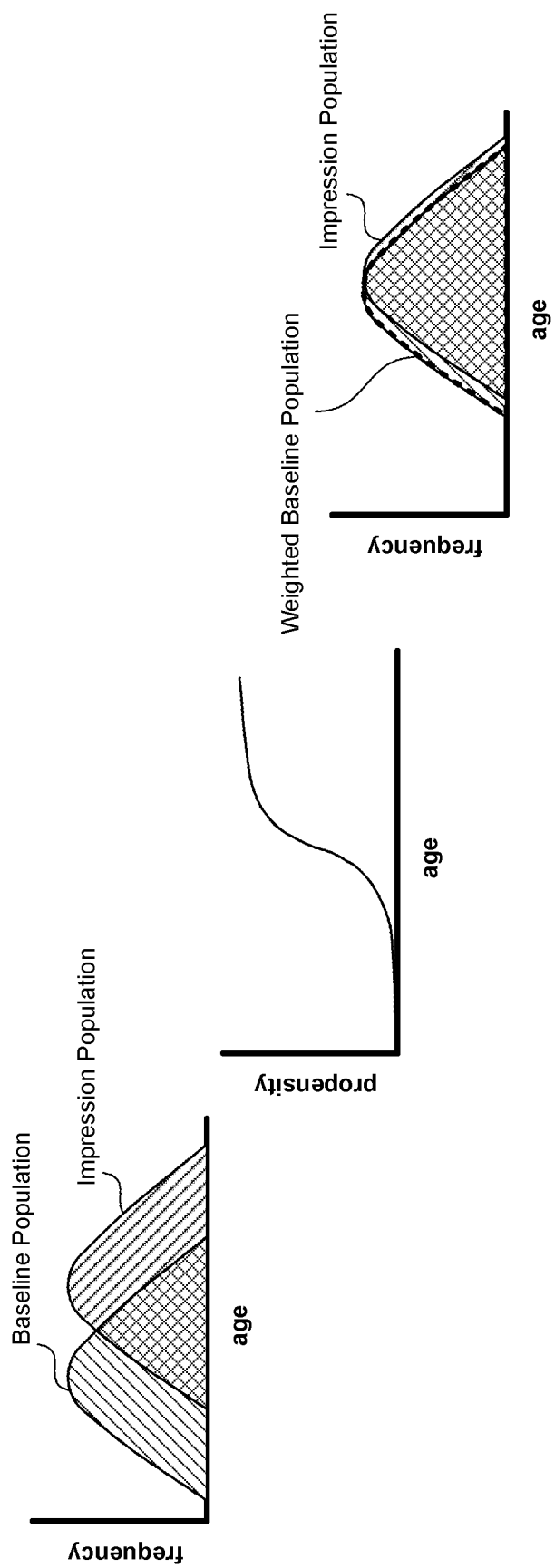
FIGS. 5A, 5B and 5C are graphical diagrams illustrating propensity modeling in the attribution system.

Propensity scoring models the differences between the impression and baseline populations. A propensity model can use demographic, geographic and/or behavioral attributes to model the impression population. For example, the impression population may be comprised of panelists who are generally older than the current population as is shown in the graphical diagram of FIG. 5A. In the graph of Figure 5A, age is plotted against a frequency of occurrence for both the impression population and the baseline population. The impression population has relatively more older panelists, whereas the baseline population has relatively more younger panelists. The process of propensity scoring generates weights that make the characteristics of the baseline population match the characteristics of the impression population. For the case of a single distinguishing characteristic, the propensity scores can be similar to the graph illustrated in FIG. 5B. The graph of FIG. 5B shows that older panelists have a higher propensity for belonging to the impression group than the younger panelists. These propensities are generated across the baseline population and then used to weight the baseline population so that the age distribution approximately matches the impression population. Once the impression and baseline populations are matched, any remaining difference in conversions can be assumed to be due to the ad exposure. For example, in FIG. 5C, the frequency of occurrence is plotted against age for both the impression and weighted baseline populations and depicts the difference in conversions between the two populations.

The propensity scoring process described above was based on a propensity model that considered a single characteristic (e.g., age). A similar propensity scoring process can be used to determine a propensity score based on a propensity model that considers multiple characteristics (e.g., gender, age group, geographical location). The output from the propensity model is a propensity score that is used to reweight the baseline population so that the reweighted baseline population has similar characteristics to the impression population.

1d. Lift Analysis

Lift analysis is one of the analyses performed by the attribution system to assess the effect of an ad in driving in-store visits at a higher rate for the users who received the ad impression. Lift is defined as the relative difference in the conversion rates between the impression and baseline populations. Three distinct conversion rates can be used to compute three types of lift:

(1) Baseline Conversion Rate ($CR_B$): the conversion rate of panelists not exposed to the ad.

(2) Adjusted Baseline Conversion Rate ($CR_{B*}$): the baseline conversion rate after adjusting for targeting effects via propensity modeling.

(3) Impression Conversion Rate ($CR_I$): the conversion rate of panelists exposed to the ad The three types of lift are then defined as follows:

(1) Total Lift $\dfrac{CR_I}{CR_B} - 1$ (2) Targeting Lift $\dfrac{CR_{B*}}{CR_B} - 1$ (3) Causal Lift $\dfrac{CR_I}{CR_{B*}} - 1$ Total Lift is the relative difference in the conversion rates between the impression and baseline populations before any propensity adjustment. Thus, Total Lift combines the effects of targeting as well as any changes in visitation behavior caused by the advertisement.

Targeting Lift measures the impact of targeting a specific set of users (e.g., "soccer moms") versus no targeting at all. Depending on whether the targeting group already has a high or low prior likelihood of making a target visit, targeting lift can be positive or negative.

Figure 6:
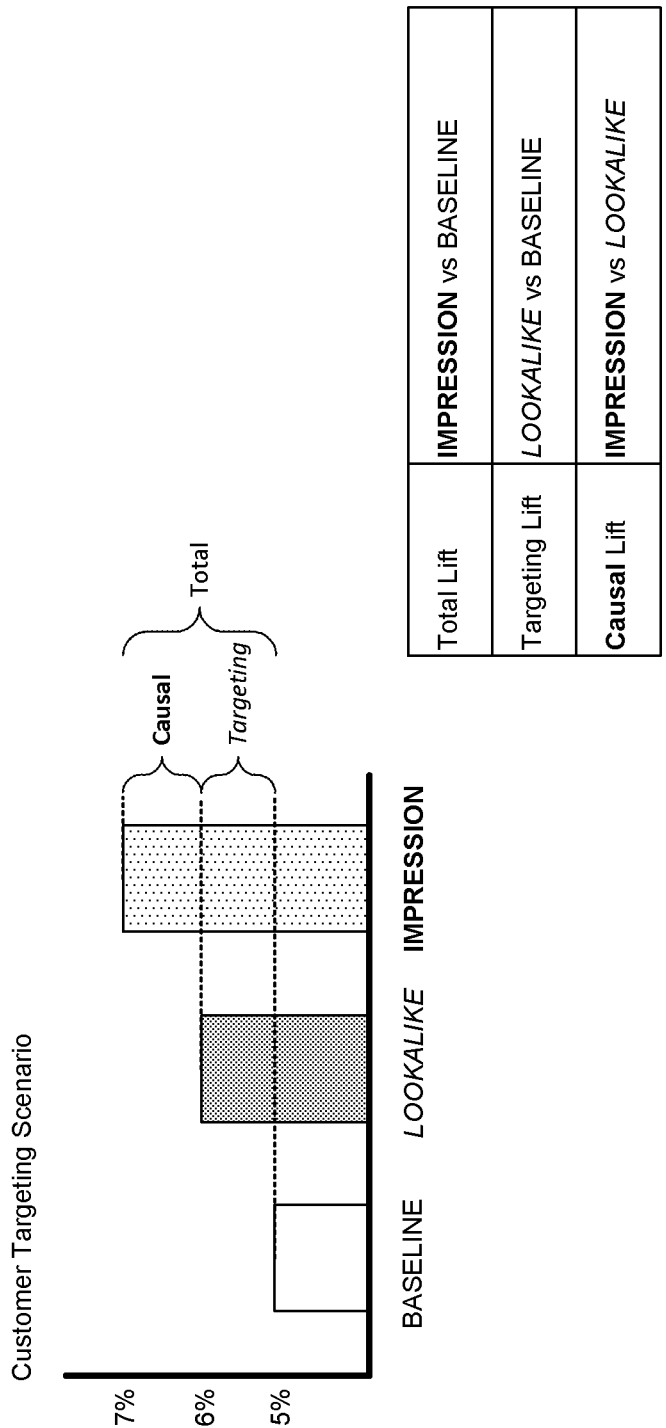
FIG. 6 is a diagram illustrating example lift metrics from a causal analysis.

Causal Lift is considered to only be a result of the ad impression, after effects of targeting are removed. By way of an example, consider the pharmacy example above where an older population was targeted for an ad. As shown in the graphical diagram of FIG. 6, the baseline conversion rate ($CR_B$) was 5%. After accounting for the older population, the adjusted baseline conversion rate ($CR_{B*}$) was 6%. Finally, the conversion rate observed in the impression group ($CR_I$) was 7%. Based on these conversion rates, the following lift metrics can be calculated:

(1) Total Lift 40% $\left(\dfrac{7}{5} - 1\right)$ (2) Targeting Lift 20% $\left(\dfrac{6}{5} - 1\right)$ (3) Causal Lift 16% $\left(\dfrac{7}{6} - 1\right)$ In this example, we can assume that the ad drove an extra 16% in conversions, after accounting for the effects of targeting ad recipients based on age.

1e. Indexing Analysis

In some embodiments, the attribution system can segment populations based on various characteristics. Example characteristics can include but are not limited to: gender, age, income, children, relationship status, ethnicity, education, geography, presence of specific mobile applications, or the like. Additional characteristics can be derived from these base characteristics to create like segments of populations, such as 'sports enthusiasts' or 'business travelers'. The attribution system can then perform an indexing analysis on any segmented population, geography and business to determine a corresponding index. Examples of index metrics determined from the indexing analysis include an impression index and a place index for different segments. The impression index provides a measure of differences between population with impression and baseline population. The place index measures the differences between the impression and baseline populations among panelists who visited the target place after viewing an ad.

These indexes enable advertisers to know if their ads effectively reached the targeted audience or if their ads were targeted to particular demographic segments, and make specific adjustments if necessary. For example, if an ad campaign was targeted to users in the West Coast more than the East Coast, a high (low) geographic index for the West Coast indicates that the impression population included relatively more (fewer) people from the West Coast than the baseline population and was thus successfully targeted to (away) users in the West Coast. Similarly, a high impression index for females would be an indication that the ad campaign was more effective at reaching females than males.

In some embodiments, the attribution system, as part of collecting user information from panelists, can collect information relating to applications that are installed on the panelists' mobile devices. The attribution system can then report to advertisers an application index that enables the advertisers to know that their ad campaigns were effective among users with certain types or specific applications in their mobile devices. For example, a high FACEBOOK index for the impression group can indicate that the users with the FACEBOOK application on their mobile devices were more receptive to ad impressions. This information can then be used by the advertiser to advertise through the FACEBOOK application, for example.

In some embodiments, the attribution system can also calculate an opportunity index or report for advertisers. The opportunity index provides advertisers with information on the geographic regions, demographics and applications that could be targeted in the next ad campaign that will increase lift. Some example index metrics are illustrated in FIG. 7.

2. Example Architecture of the Attribution System

Figure 8:
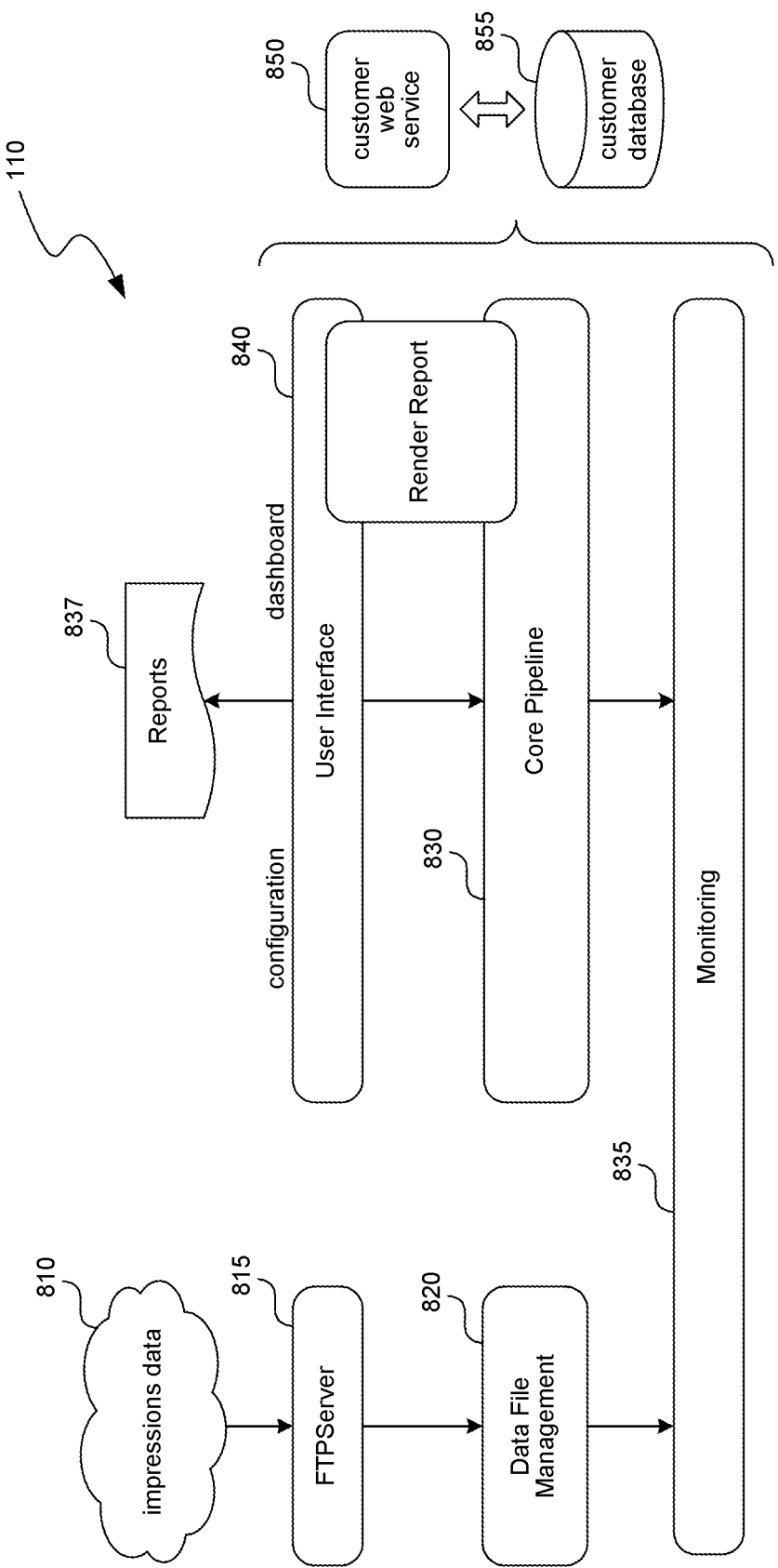
FIG. 8 is a block diagram illustrating an example architecture of the attribution system.

FIG. 8 is a block diagram illustrating an example architecture of an attribution system 110. In some embodiments, the attribution system 110 receives impression data 810 from third-parties such as advertisers, ad-networks, etc. In some embodiments, the impression data can be collected by an agent of the attribution system. In other embodiments, some impression data can be received from third-parties and some impression data can be collected by the attribution system. Impression data from third-parties can be uploaded to the attribution system via an FTP server 815 or delivered to a proprietary server by using embedded code (e.g., a 'pixel' tag, or other industry standard method of passing data via a web service) within the ad. The impression data then flows through a data file management component 820 for initial processing and a core pipeline 830 for further analyses.

A monitoring component 835 monitors the progress of impression data processing to trigger an alert to the core pipeline that impression data is available for analyses. The monitoring component 835 also monitors the output from the core pipeline 830 to render reports 837 and update a user interface 840 to allow customers access to the reports. A web service 850 provides customers access to reports and/or other data from the analyses stored in a customer database 855.

The attribution system 110, therefore, may include an impression component that receives campaign impression data associated with media consumption at multiple mobile devices during a campaign, a location visit component that determines whether one or more of the multiple mobile devices visit a geographical location associated with the campaign within a time window for the campaign, and an attribution component that identifies occurrences of conversion events for the campaign when the one or more mobile devices visit the geographical location associated with the campaign within the time window for the campaign.

Each of the components will now be described in detail.

2a. Data File Management

Figure 9:
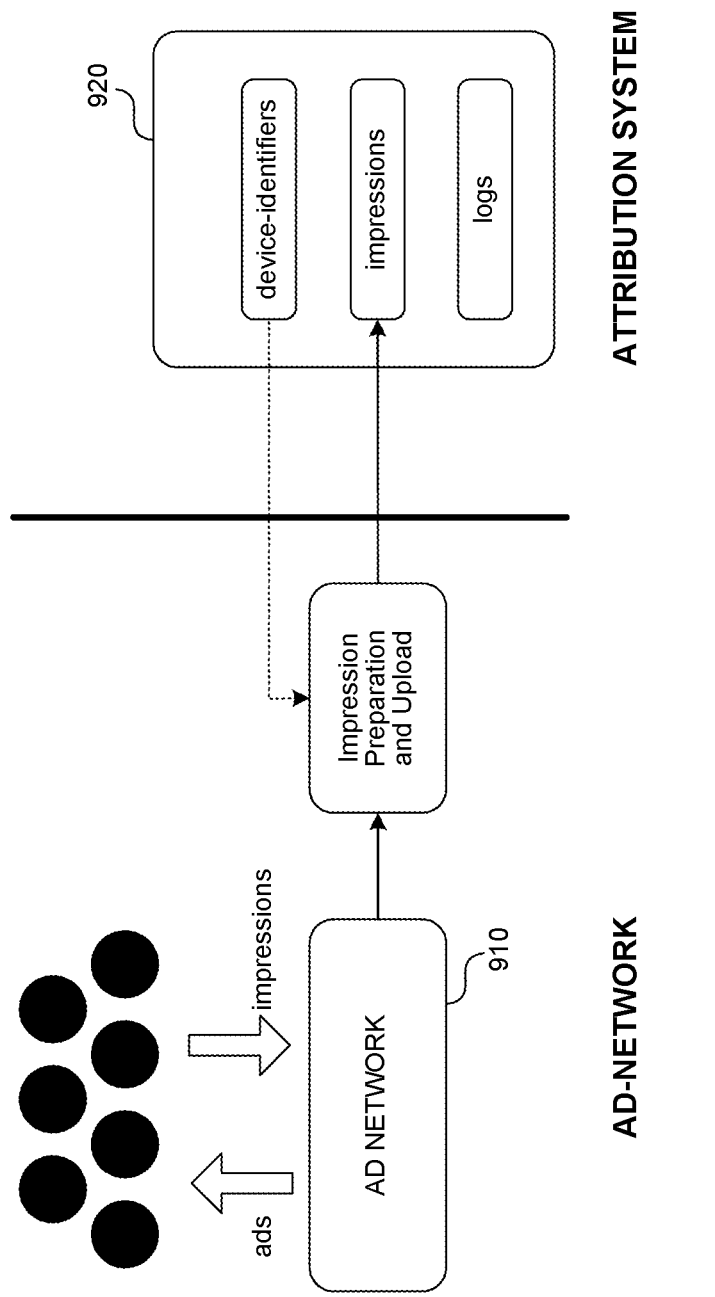
FIGS. 9-12 are block diagrams illustrating data file management in the attribution system.

FIGS. 9-12 are block diagrams illustrating processes performed by the data file management component 820 in the attribution system 110. Referring to FIG. 9, an ad-network 910 sends ads to devices 920 of users and in return, obtains one or more pieces of content or impression data from the devices 920 of the users. The impression data informs the attribution system 110 who got what and when. For example, impression data for an ad campaign can inform the attribution system 110 that device A got a HMC store ad at 3:18 pm on Mar. 1, 2014. Thus, impression data generally includes the following pieces of information:

1. a unique identifier to identify a device, usually a device identifier (deviceid), cookie, user-agent string, etc., and can be hashed for privacy;

2. a sub-placement identifier to determine what the impression was about; and 3. a timestamp of the impression to indicate the timestamp in second of when a user got the impression.

If the impression data is provided in a flat file, it is prepared and can be uploaded to the FTP server of the attribution system. In some embodiments, preparing the impression data can include hashing the device identifiers or other information for privacy reasons, so that only hashed device identifiers are provided to the attribution system. In some embodiments, the ad network can provide impression data to the attribution system by uploading the impression data to file storage/sharing services (e.g., GOOGLE DOCS, DROPBOX, AMAZON S3) or sending the impression data via email. Each upload event can be logged in a log at the FTP server 815. In some embodiments, impression data can be passed in real-time as the ad is served (via embedded code within the ad).

Figure 10:
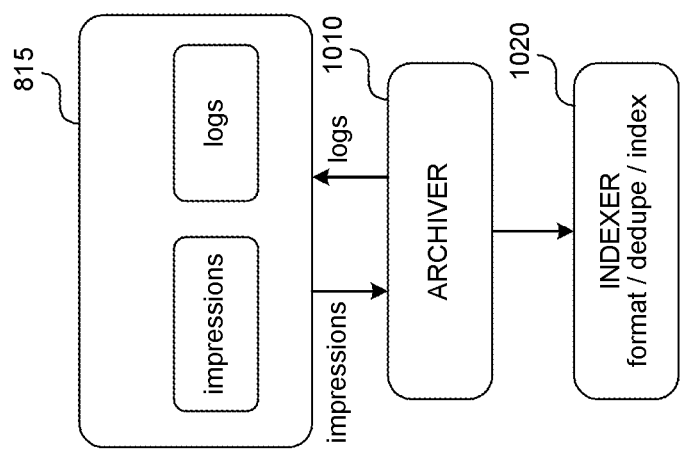

The attribution system stores the impression data in one or more databases or database tables. In some embodiments, for cheaper and/or scalable storage and easy retrieval during processing, the attribution system can archive and index the impression data using an archiver 1010 and an indexer 1020, respectively, as depicted in FIG. 10. The indexer 1020 can use sub-placement-id and timestamp to index the impression data for efficient retrieval of impression data.

Figure 11:
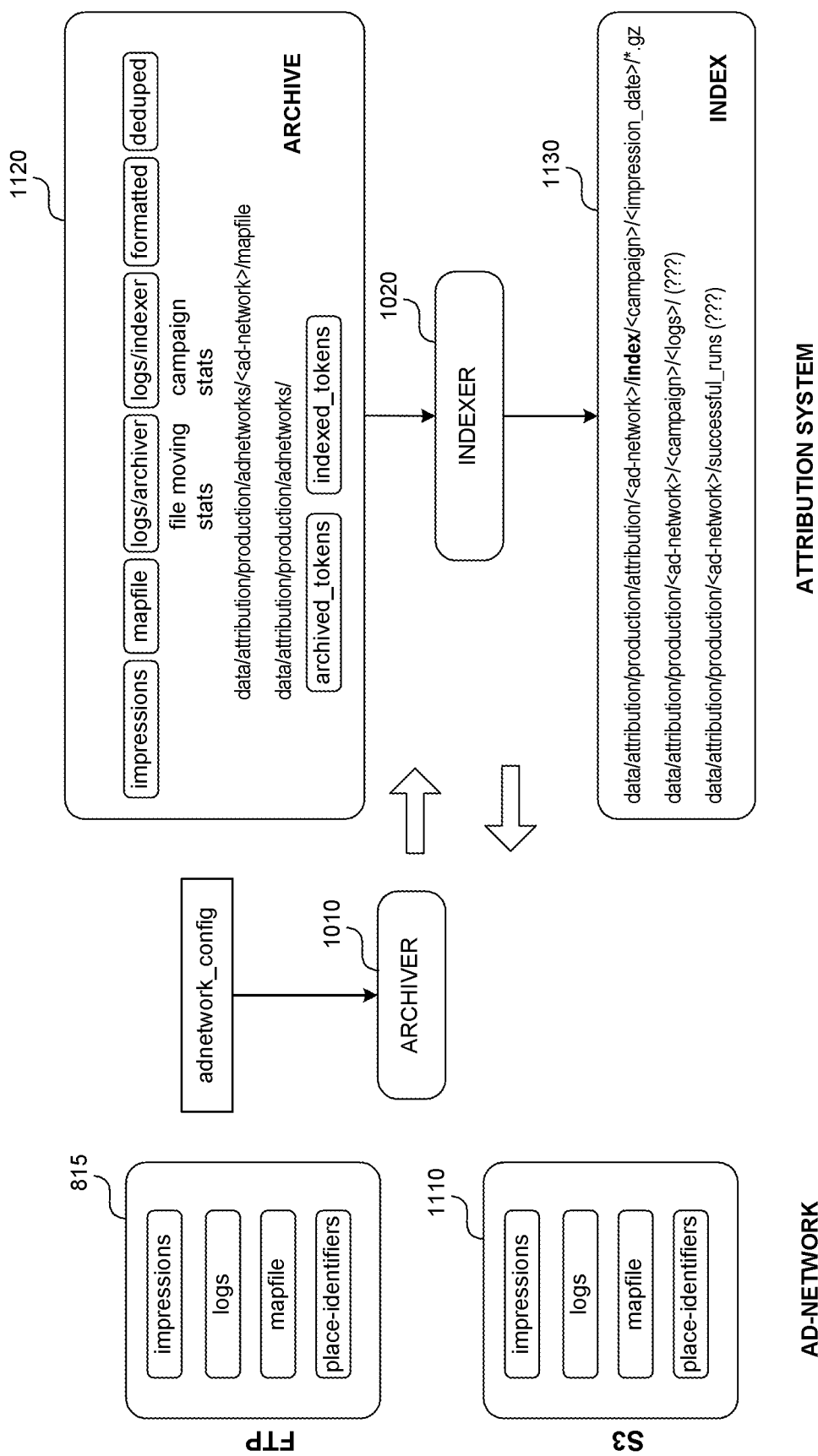

Referring to FIG. 11, the FTP server 810 or another location (e.g., cloud-based storage) 1110 where the impression data is uploaded can include impressions, as well as other files such as logs, mapfile and device-identifiers. To process the files, the attribution system 110 reads configuration data associated with the ad-network to determine active networks. The attribution system then generates processing-id (e.g., timestamp) and sets up destination folders where the processed impression data is to be stored. All files from the source, including impressions and mapfiles are copied to the destination archive 1120 and the action is logged in archiver logs in the destination. Once the files are successfully copied, the files at source are deleted, and an archived token is created with processing-id as file-name and processing-id and path to destination as content. Then an acknowledgement is written to a source log.

After archiving, the impressions are formatted, deduped and indexed. Formatting can include applying custom network formatter on impressions and persisting the formatted data. Deduping can include applying a key (e.g., device-id, campaign and timestamp triplet) to eliminate duplicates from archive-formatted and indexed-impressions. The deduped impressions can then be indexed by impression date in an index 1130. The archive logs are then updated to record the move and other statistics. After successfully moving the data, indexed tokens are created.

The file processing continues, by reading the indexed tokens from recent runs. For each token, the file processing pipeline copies archive logs from the destination to the source and then deletes the index token. Following deletion, an acknowledgement is written to the source log and the "successful runs" log is updated.

Figure 12:
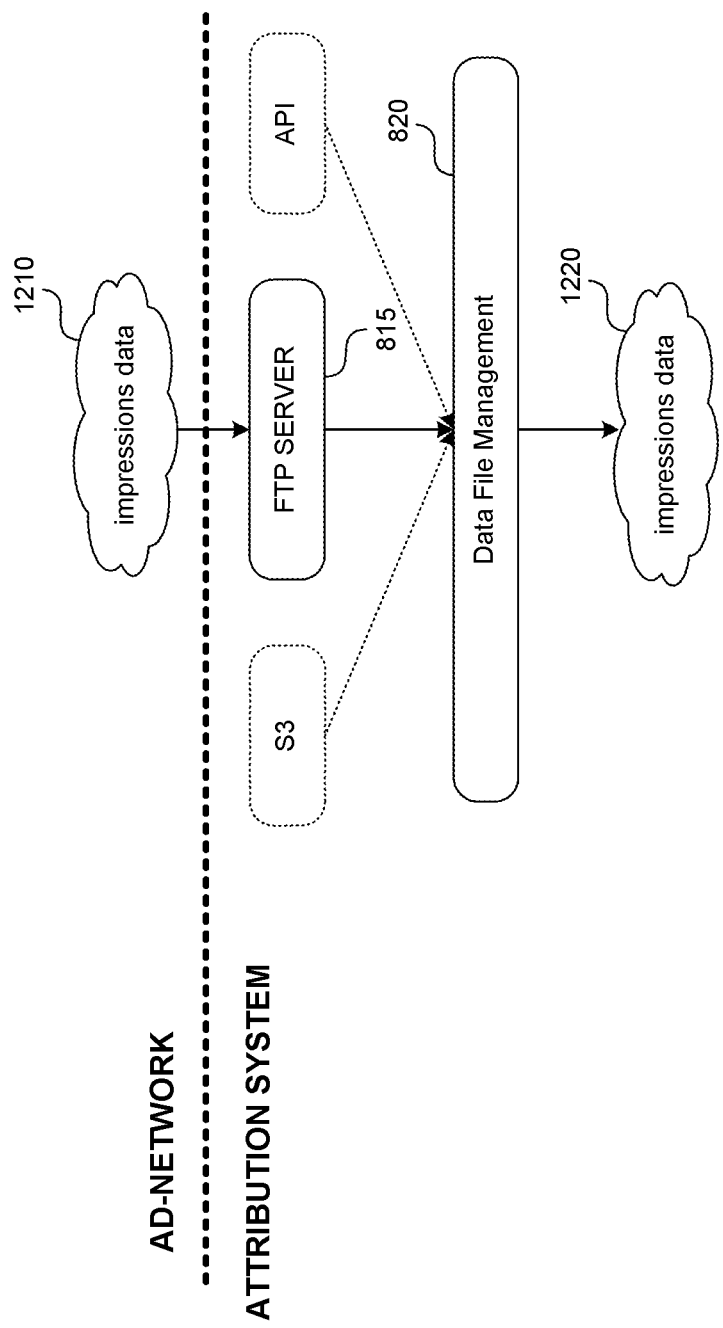

Referring to FIG. 12, the data file management process is illustrated, with the data file management component being a point of integration between the attribution system and external ad-networks. As explained above, the impression data from ad-networks are directly uploaded 1210 to the FTP server 815 or cloud-based storage or transmitted using API or other channels to the attribution system 110. The data file management component pulls the impression data and processes the impression data by formatting, deduping and indexing 1220 for efficient storage and retrieval of the impression data.

2b. Core Pipeline

Figure 13:
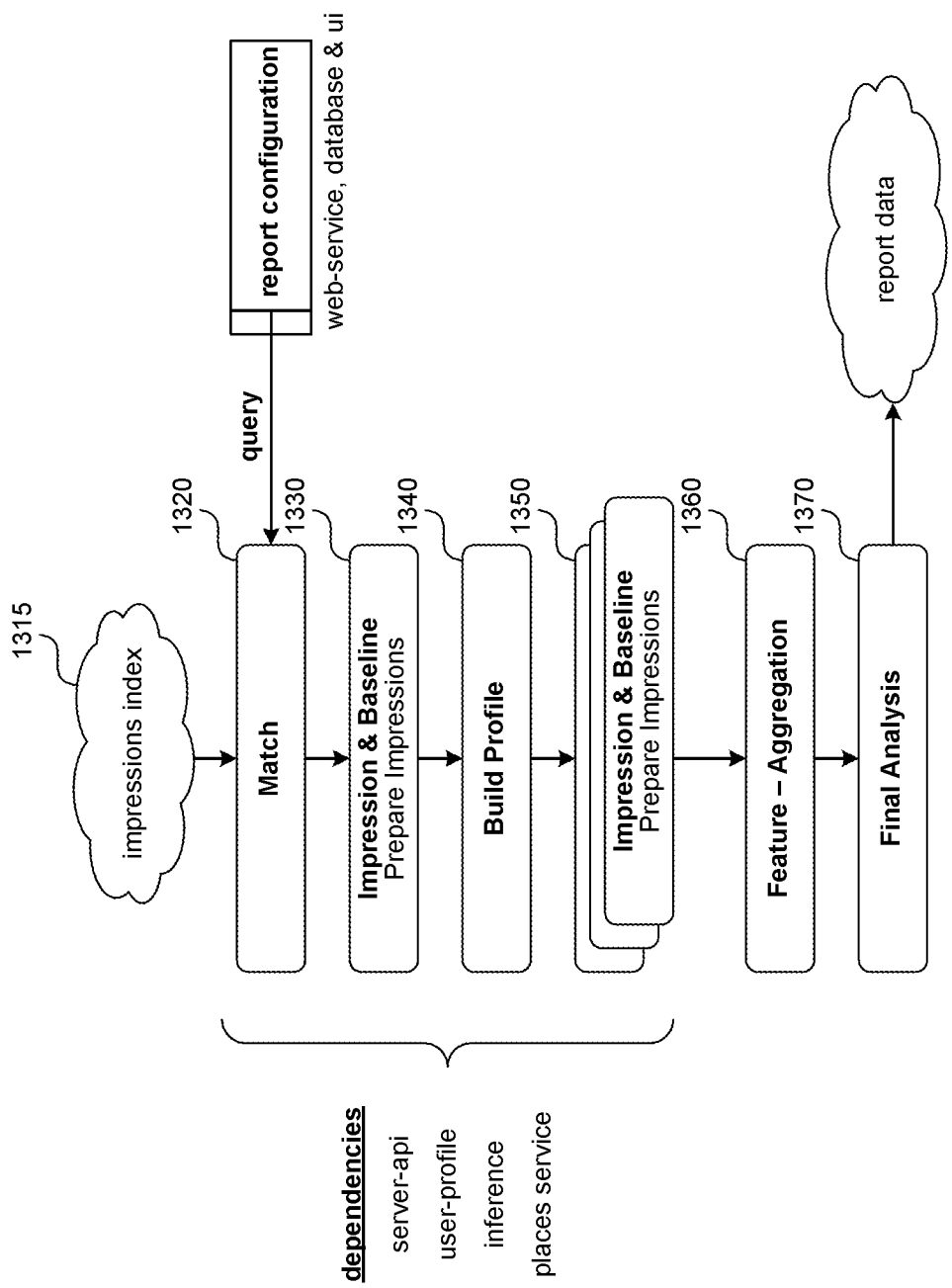
FIG. 13 is a block diagram illustrating a core pipeline of the attribution system.

The core pipeline of the attribution system is illustrated in FIG. 13. As illustrated, the core pipeline has several dependencies including, for example, server-api, user profile, inference, and place service. These dependencies are described in detail in U.S. patent application Ser. No. 13/405,182 and U.S. Pat. No. 8,768,876.

Referring to FIG. 13, the core pipeline receives a web service query including report configuration parameters. The query triggers retrieval and processing of impression data associated with an ad campaign. Based on the report configuration parameters (e.g., placement id, sub-placement id, conversion window), the core pipeline retrieves impressions data 1315 associated with the campaign. The core pipeline then performs a match 1320 against the panelists of the attribution system to identify impression users 1330 who were exposed to the impressions associated with the campaign and baseline users who were not exposed to the impressions. The matching process is described in detail in reference to FIG. 14 and the method of synthesizing baseline users is described in detail in reference to FIG. 15.

The core pipeline then builds attribution profiles 1340 for each user in the impression or the baseline group by joining the impression data associated with the user with their existing user profile, and performs user aggregation 1350 and feature aggregation 1360. A user profile can include information such as demographics (e.g., age, gender, income level, ethnicity, education, marital status, number of children, etc.), mobile device information, user location history, distance to home location, distance to work location, commute patterns, device features (e.g., manufacturer, model, service provider, sensor availability, etc.), frequently visited places in the past and/or other information that can help predict where a user is visiting.

In some embodiments, the user profile and/or attribution profile 1340 may include or be enhanced by information received from users in response to surveys or polls asked or provided to users. For example, information received via a survey (e.g., information about what movie a user watched in a movie theatre), such as survey data, may provide additional conversion data attributed to a user, other than directly measured data, such as location visits (e.g., what movie theatre the user visited) and other geographical data.

As described herein, various types of information may be obtained via user surveys, such as user preference data, user purchasing data, user choice data, user interest data, and so on. The data collection system, therefore, may utilize various types survey and poll questions when obtaining information from users. Following the movie theatre example, a user survey targeted to a user at a movie theatre may include the following questions:

Questions directed to purchasing habits—e.g., "Did you buy the tickets?", "How did you buy the tickets?", "Did you buy refreshments?", and so on;

Questions directed to purchasing information—e.g., "How much did the tickets cost?", "When did you see the movie?", and so on;

Questions directed to user preferences or interests—e.g., "Did you enjoy the movie?", "Was the movie your first choice?", and so on;

Questions directed to user habits or actions—e.g., "Did you drive to the theatre?":Did you go to dinner before or after the movie?" "Did you go to other places while out?", and so on.

Figure 16:
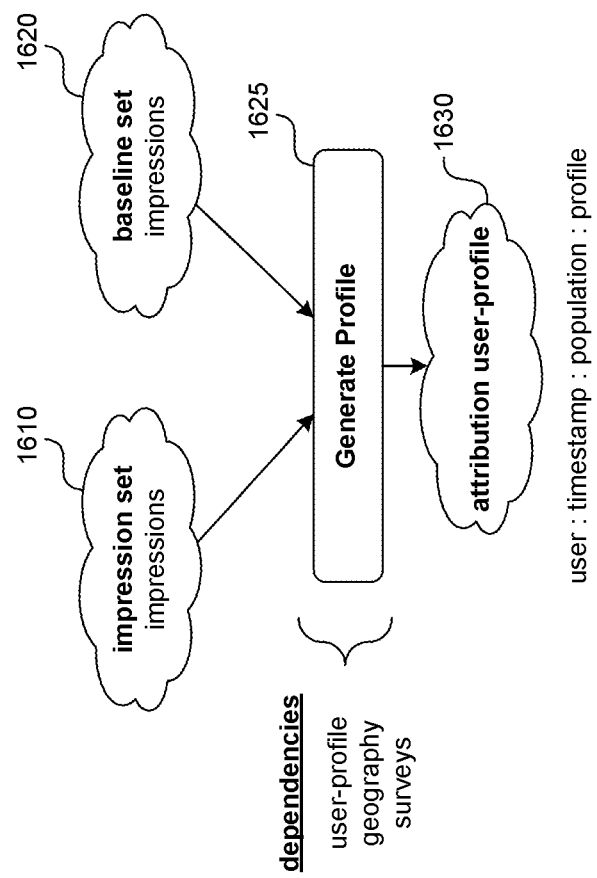
FIG. 16 is a block diagram illustrating a method of generating attribution user profiles.
Figure 17:
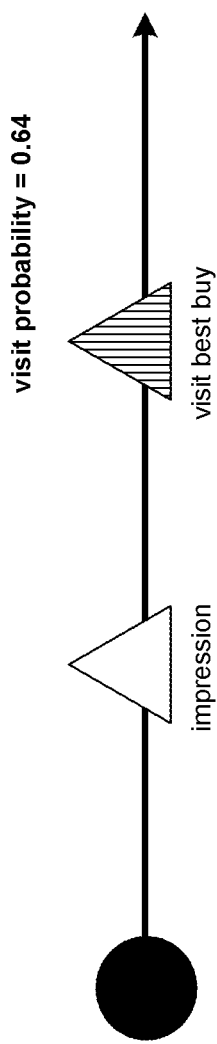
FIG. 17 is a diagram illustrating example attribution metrics determined or inferred by the attribution system.
Figure 18:
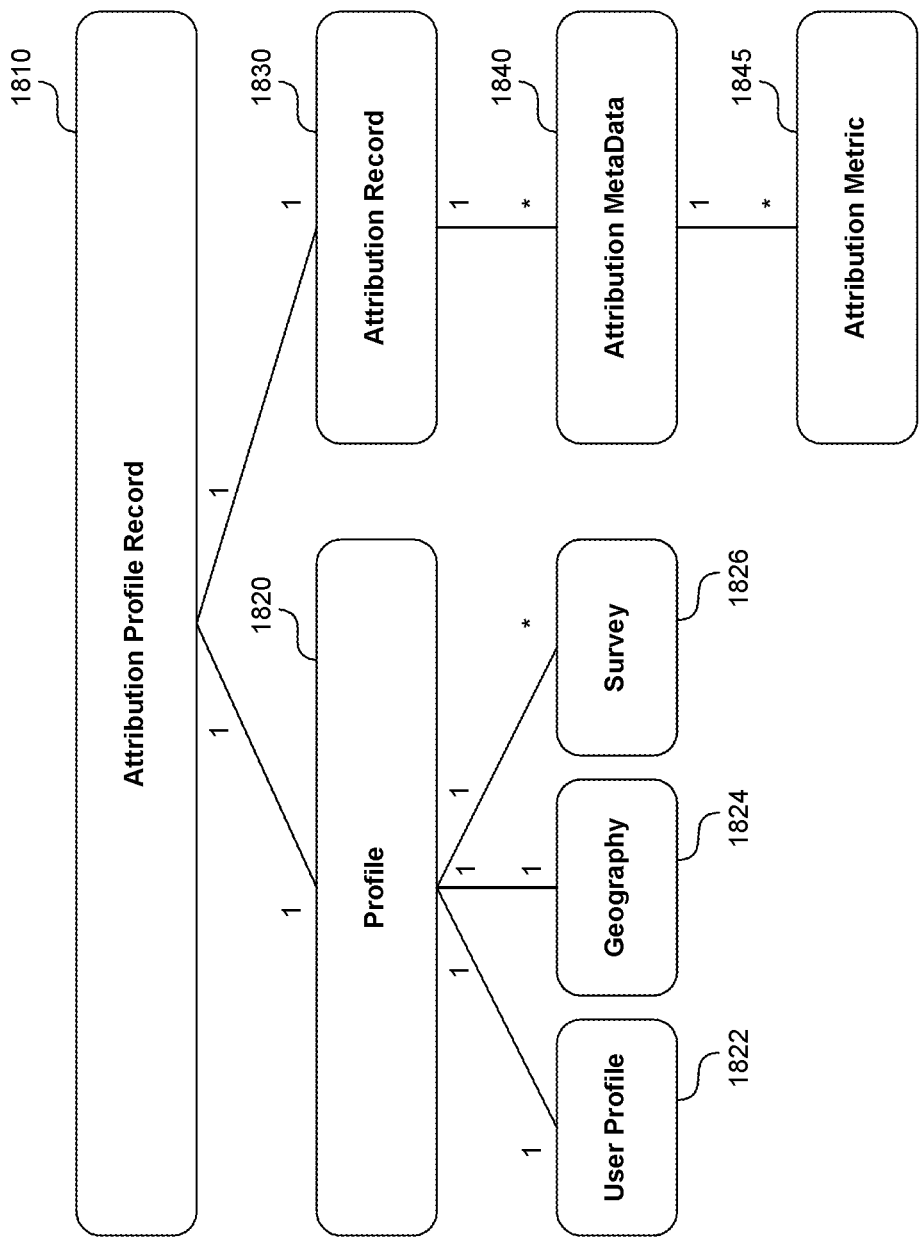
FIG. 18 is a block diagram illustrating an example of an attribution data model of the attribution system.

FIGS. 16-18 depict the example embodiments of the attribution profile, aggregation metrics, and full data model. The core pipeline then performs various analyses 1370, including cluster analysis, affinity analysis and causal analysis to aggregate metrics at the user level. These analyses are described in detail with reference to FIGS. 19-22. The aggregated metrics at the user level are then aggregated over one or more features to obtain grouped aggregated metrics. The process of aggregating metrics over one or more features are described with reference to FIGS. 23 and 24. The core pipeline then performs an attribution analysis to generate the various metrics associated with an attribution report such as conversion rates, lift and indexes. The process of performing the attribution analysis is described in detail with reference to FIG. 24.

Figure 14:
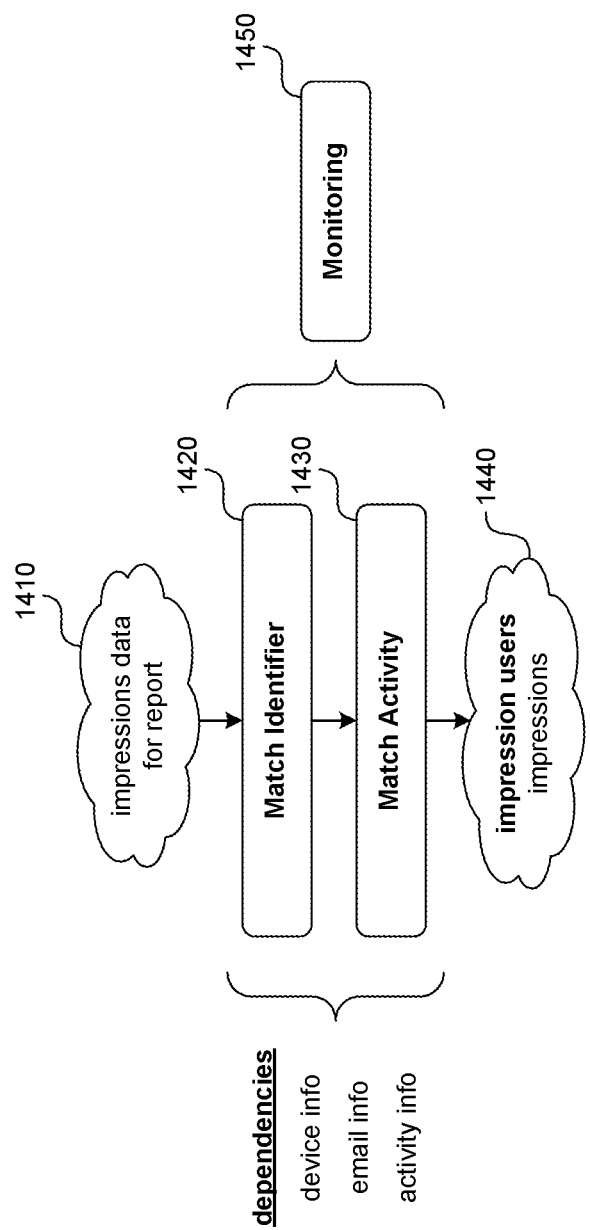
FIG. 14 is a block diagram illustrating a method of identifying impression users.

FIG. 14 is a block diagram illustrating a method of identifying impression users implemented by the core pipeline of the attribution system 110. The core pipeline retrieves impression data 1410 associated with a campaign from a database. The core pipeline then matches 1420 hashed device identifiers from the impression data against hash device identifiers of the panelists of the attribution system to identify impression users. In some embodiments, the core pipeline can also match activity 1430 so that the impression users that are selected are active users (e.g., users who are responsive to surveys, users with devices that have been reporting location data, etc.). The impression users and impressions (e.g., user id: timestamp) are then stored 1440 for further processing. The generation of match metrics (e.g., impression users and impressions) are monitored 1450 by the monitor of the attribution system to create alerts for the web service and user interface components.

Figure 15:
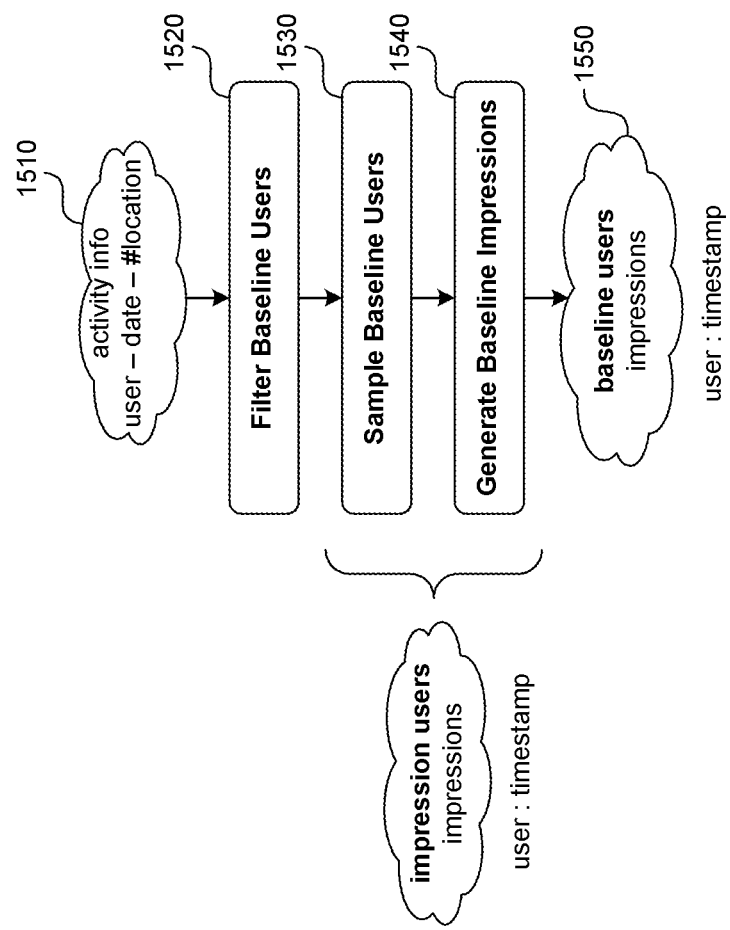
FIG. 15 is a block diagram illustrating a method of synthesizing baseline users.

FIG. 15 is a block diagram illustrating a method of synthesizing baseline users from the panelists of the attribution system who are not among the impression users. The core pipeline can retrieve activity information (e.g., user id, date, number of locations) 1510 and use one or more filter criteria to filter baseline users 1520. Example filter criteria can include, but are not limited to: panelists who are not in the impression set, who are active during campaign, who have responded to surveys, who have cluster activity, or the like. The core pipeline can then sample the baseline users 1530. In some embodiments, by default 100,000 baseline users may be selected. The core pipeline then generates baseline impressions 1540 by sampling timestamps from the impressions users and assigning simulated impression times in the same distribution as was observed in the impression users. The baseline users and impressions (e.g., user id: timestamp) are then stored 1550 for further processing.

FIG. 16 is a block diagram illustrating a method of generating 1625 attribution user profile by joining impression set impressions 1610 and baseline set impressions 1620 with dependencies such as user-profile, geography, and/or surveys. An attribution user-profile record 1630 stores associations between user id, timestamp, population (e.g., impression or baseline) and user profile.

The attribution system generates various attribution metrics that are stored in association with attribution user-profile records (or attribution profile records). FIG. 17 is a diagram illustrating example attribution metrics determined or inferred by the attribution system. Some examples of attribution metrics and their definitions are listed below in Table 1. These

TABLE 1

Example Attribution Metrics

| Attribution Metrics | Definition |
| --- | --- |
| p_target | Probability of a visit to a target place (e.g., BESTBUY store) or a visit to a target place which sells a particular product, after receiving an impression and within the conversion window |
| p_anywhere; | Probability of a visit to any place after receiving an impression and within the conversion window |
| cluster_count | Number of clusters captured within a conversion window |
| visitor_days_target | The number of visits to a target place after receiving and impression and within the conversion window |
| visitor_days_anywhere | The number of visits to any place after receiving an impression and within the conversion window |
| Propensity or propensity score | Output from a propensity model to account for differences between an impression population and a baseline population |
| expected_impression_response | Predicted conversion rate assuming the user was exposed to an ad |
| expected_baseline_response | Predicted conversion rate assuming the user was not exposed to an ad |
| expected_impression effect | Difference between mean of expected_impression_response for the impression population and mean of expected_baseline_response for the baseline population |
| expected_baseline_effect | Mean of expected_baseline_response for the baseline population |
| double_robust_residual | The error in the doubly robust estimate of the causal effect, used for computing a confidence interval |
| p_affinity_overlap | The probability that the user visited both the target place and some other predefined place within the conversion window |
| p_index_overlap | The probability that the user visited both the target place and some other predefined feature including, but not limited to, geography, demographic, device, wireless carrier, operating system, time of day, day of week, within the conversion window |
| p_purchase | Purchases tied to store visits attributable to ad impressions |
| p_revenue | Revenue tied to store visits attributable to ad impressions |

FIG. 18 is a block diagram illustrating an example of an attribution data model of the attribution system. In FIG. 18, the attribution profile record 1810 is created by joining profile and attribution record as described with reference to FIG. 16. The profile 1820 includes user profile 1822, geography 1824, and survey data 1826. The attribution record

1830 stores associations between user id and population (e.g., baseline or impression) and is associated with a set of attribution metadata 1840. Examples of the attribution metadata include, but are not limited to: impression-timestamp, event-type, event-id, window-start, window-end and analysis-tag. Each attribution record, for a given set of attribution metadata, is also associated with one or more of the attribution metrics 1845 listed in Table 1 above.

Figure 19:
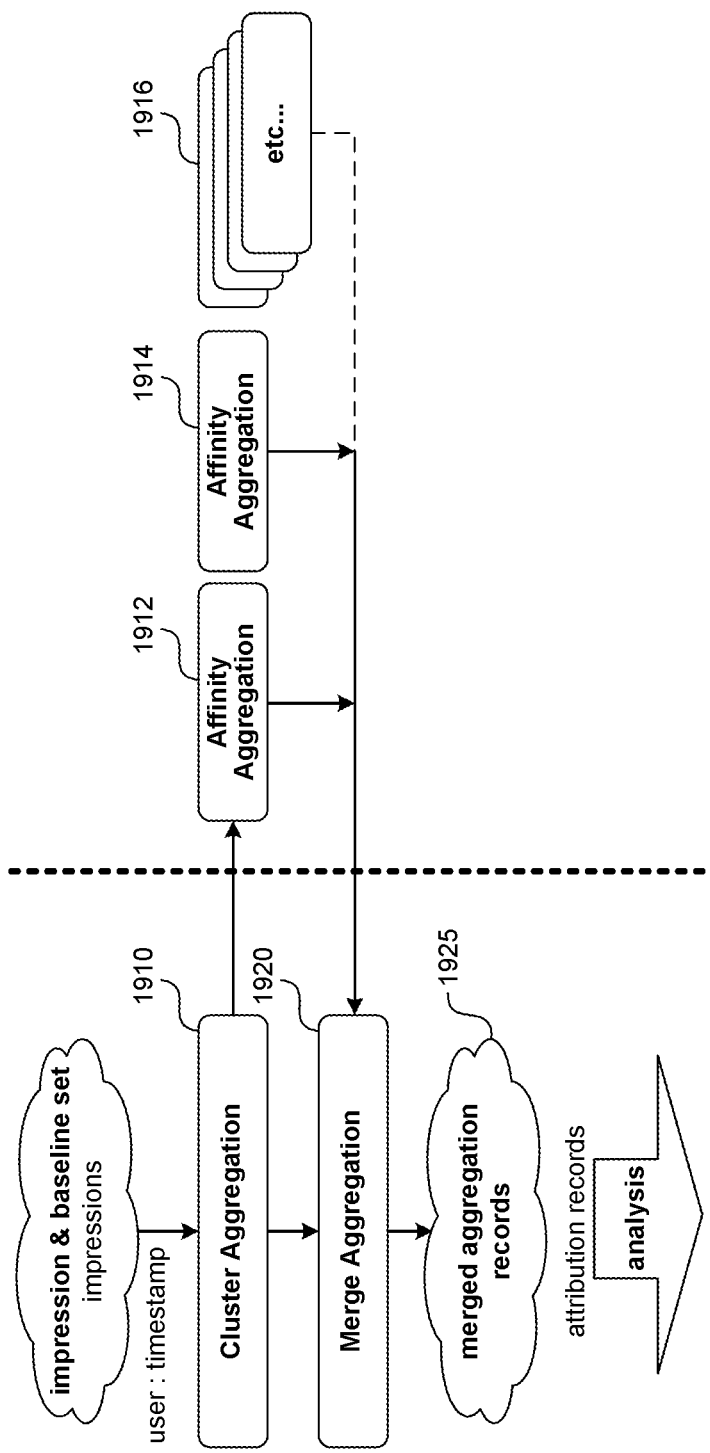
FIG. 19 is a block diagram illustrating flexible metric aggregation in the attribution system.

FIG. 19 is a block diagram illustrating flexible metric aggregation in the attribution system 110. Various metrics from cluster aggregation 1910, affinity aggregation 1912, casual aggregation 1914, and other metrics 1916 can be merged 1920 resulting in merged aggregation records 1925. As additional aggregation methods are added or deleted, the aggregation records can be updated without making any changes to the attribution data model or other components of the attribution system. The merged aggregation records created from the merging of aggregation results provide the attribution records used in the attribution analysis 1930 by the core pipeline.

Figure 20:
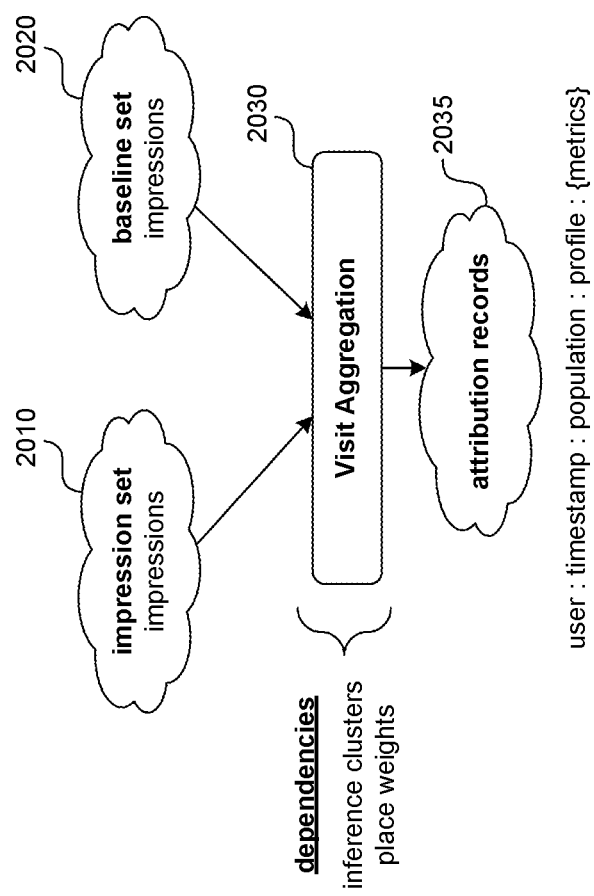
FIG. 20 is a block diagram illustrating user visit or cluster data aggregation in the attribution system.

Various type of aggregations performed by the core pipeline will now be described. FIG. 20 is a block diagram illustrating user visit or cluster data aggregation. Using inference cluster visit data including place weights, the core pipeline can determine the visit metrics of the impression 2010 and baseline users 2020. The inference cluster visit data is determined by an inference pipeline that is described in detail in U.S. Pat. No. 8,768,876. The inference pipeline takes raw location and sensor readings from a device of a user as input and generates probabilities that the user visited a target place (e.g., p_target) or anywhere else (e.g., p_anywhere). The inference pipeline can also determine other visit data such as cluster_count for the impression and baseline users and determine or infer other visitation data such as visitor_days_target and visitor_days_anywhere. The results from the cluster or visit aggregation analysis 2030 are stored in cluster attribution records 2035, which are eventually merged with other types of attribution records to form the attribute profile records as described before. A cluster attribution record stores association between a user id, timestamp, population (baseline or impression), profile and metrics (e.g., visit metrics, for example, p_target, p_anywhere, visitor_days_target, visitor_days_anywhere, cluster_count).

In some embodiments, in addition to or instead of location data collected from mobile devices, the attribution system can collect beacon data points. Some target places (e.g., stores), use beacon devices to broadcast information (e.g., information about a store) to devices using Bluetooth technology. Typically, a beacon device broadcasts a notification to any device that is within its range. In some embodiments, an application or an agent of the attribution system on a mobile device of a user can collect a beacon data point from a beacon device located at a target place. The attribution system can obtain the beacon data point from the mobile device and associate it with a device identifier. Once the beacon data point is associated with the device identifier, the attribution system can use that device identifier for matching and as confirmation that the user visited the target place.

Figure 21:
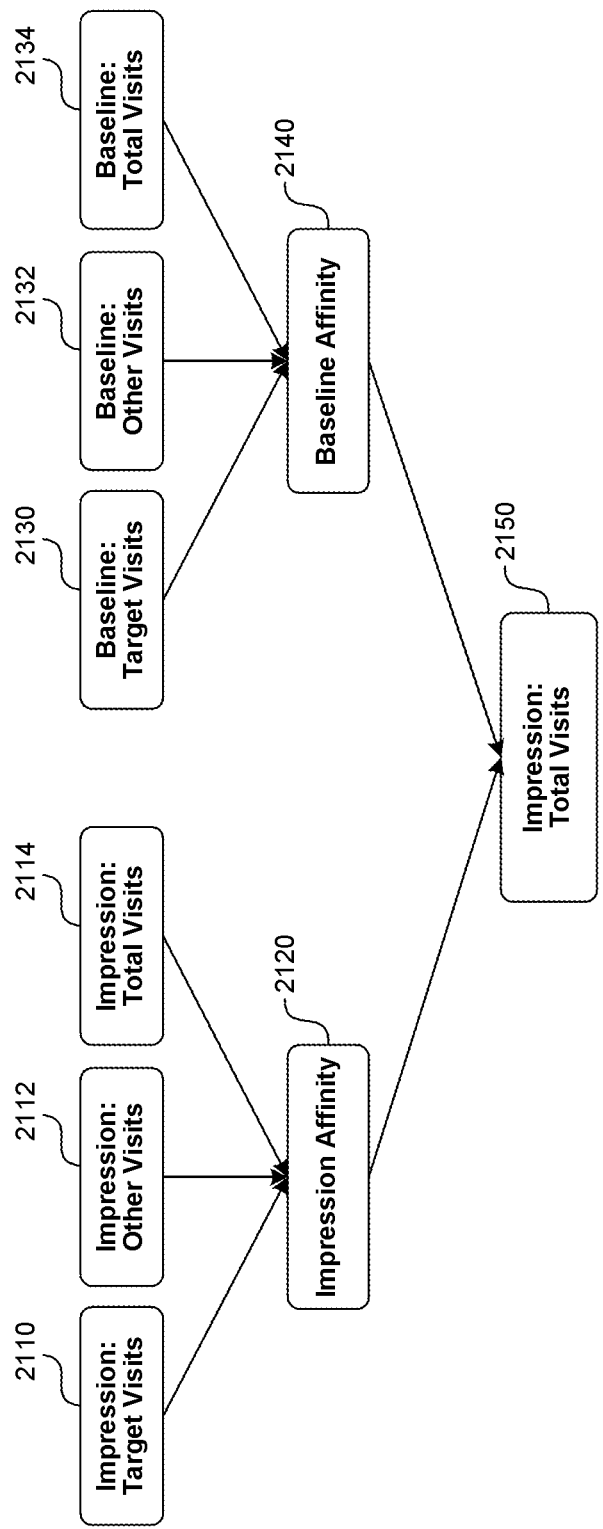
FIG. 21 is a block diagram illustrating affinity aggregation in the attribution system.

FIG. 21 is a block diagram illustrating affinity aggregation to determine an affinity index. Data associated with visits to a target place 2110 by an impression population, data associated with visits to other places 2112 by the impression population, and overall total place visits 2114 by the impression population, are utilized to determine impression affinity 2120 or affinity of the target place for the impression population. Further, data associated with visits to a target place 2130 by a baseline population, data associated with visits to other places 2132 by the baseline population, and overall total place visits 2134 by the baseline population, are utilized to determine impression affinity 2140 or affinity of the target place for the baseline population.

The affinity metric measures the likelihood that a user visits the target place, given that they are a visitor to some other place. This metric is calculated for the impression and baseline populations separately.

Based on the impression affinity and the baseline affinity, the affinity index can be determined 2150 as:

$$\text{Affinity Index} = (\text{Impression Affinity}/\text{Baseline Affinity}) \times 100$$

Figure 22:
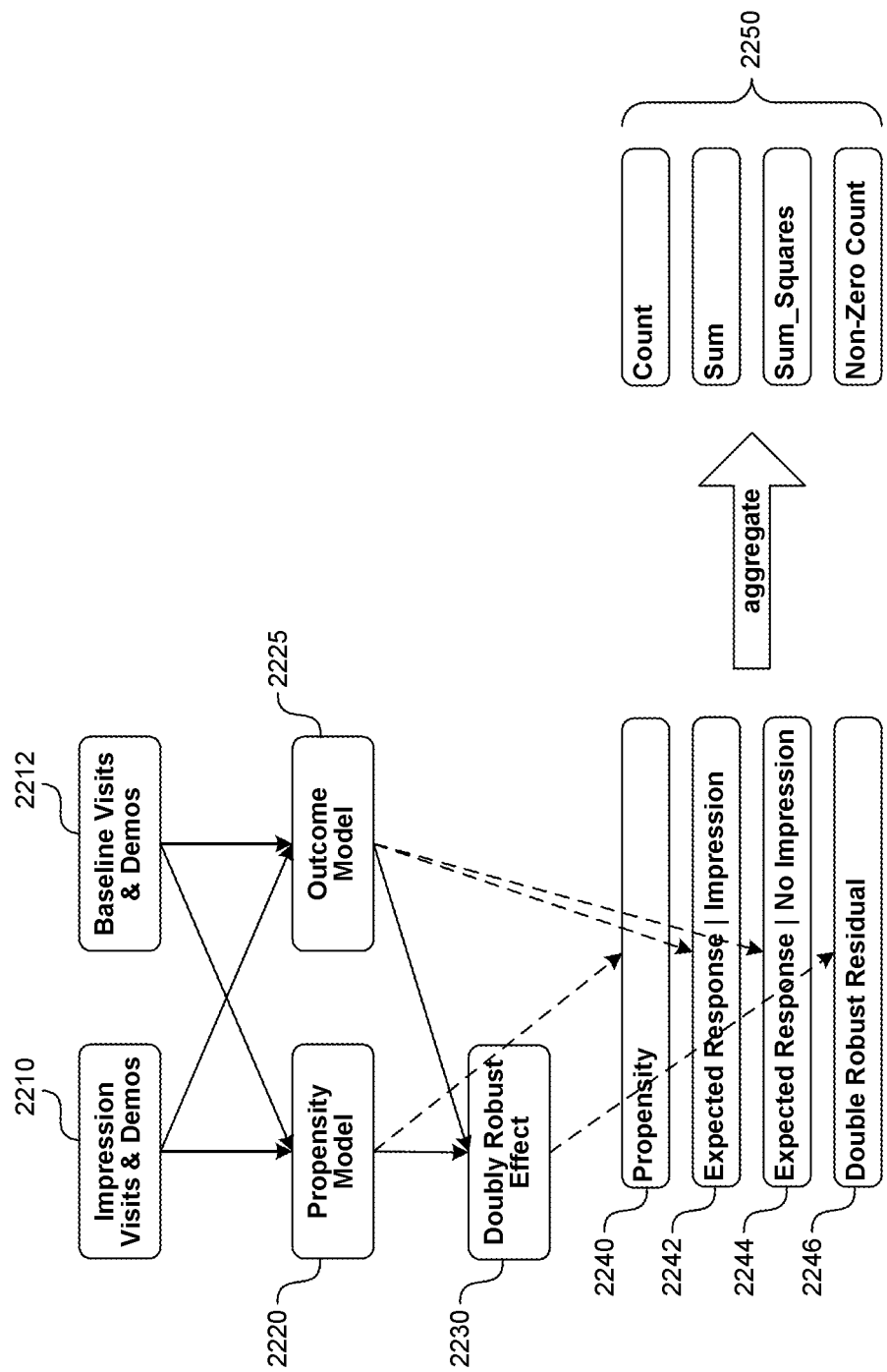
FIG. 22 is a block diagram illustrating causal aggregation in the attribution system.

FIG. 22 is a block diagram illustrating causal aggregation to determine aggregate metrics. Results from causal aggregation allows one to make causal inference on whether place visits by the impression population are attributable or caused by exposure to the ad impressions. As described above, the propensity model 2220 weights the baseline population so that the characteristics of the baseline population match those of the impression population. Any difference in behavior between the two groups is then attributable to the exposure to the ad impression. The outcome model 2225 is another model that can be used to determine from the impression data 2210 and baseline data 2212, expected response with exposure to the ad impressions and expected response with no exposure to the ad impression. The doubly robust method 2230 of causal analysis uses a combination of the propensity model and the outcome model to estimate the causal effect of the ad impression on the place visit. The propensity model or the outcome model, if used alone, are unbiased only if the model is correct. The doubly robust effect ensures that the causal effect that is estimated is unbiased if only one of the two models is correct.

The results from these models including propensity 2240, expected response with impression 2242, expected response with no impression 2244, and double robust residual 2246 are aggregated to determine the aggregation metrics 2250 of count, sum, sum of squares and non-zero count. This set of summary metrics 2250 is sufficient to estimate the mean and variance for any aggregated metrics so that they may be subjected to standard statistical testing.

The attribution profile is unique to each user and can include information such as: user/device id, gender, location, probability of visit to the target place, number of visits to the target place or the like. Example attribution profiles are listed below:

device-a:male:Seattle:[p(t)=0.60, visits=2]

device-b:female:Seattle:[p(t)=0.30, visits=1]

device-c:male:Portland:[p(t)=0.50, visits=4]

Figure 23:
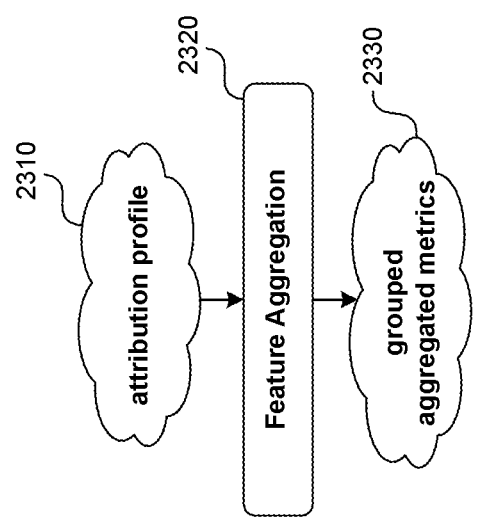
FIG. 23 is a block diagram illustrating feature aggregation in the attribution system.

The process of feature aggregation, as illustrated in FIG. 23, aggregates 2310 data from the attribution profile 2310 of users across various features 2320 to generate group aggregated metrics 2330. As used herein, a feature is a characteristic of a user segment. For example, the attribution profile data shown above can be aggregated across the feature "male," "female," "Seattle" and "Portland" to determine the grouped aggregated metrics as shown below.

male:[size=2 & p(t)=function(0.6, 0.5) & visits=6]

female:[size=1 & p(t)=function(0.3) & visits=1]

Seattle:[size=2 & p(t)=function(0.6, 0.3) & visits=3]

Portland:[size=1 & p(t)=function(0.5) & visits=4]

The following example template can be used for the grouped aggregation metrics:

SECTION::FEATURE::ATTRIBUTE=>[Aggregation Metrics]

For example:

DEMOGRAPHICS::GENDER::MALE=>[Aggregation Metrics]

DEMOGRAPHICS::STATE::CALIFORNIA=>[Aggregation Metrics]

Figure 24:
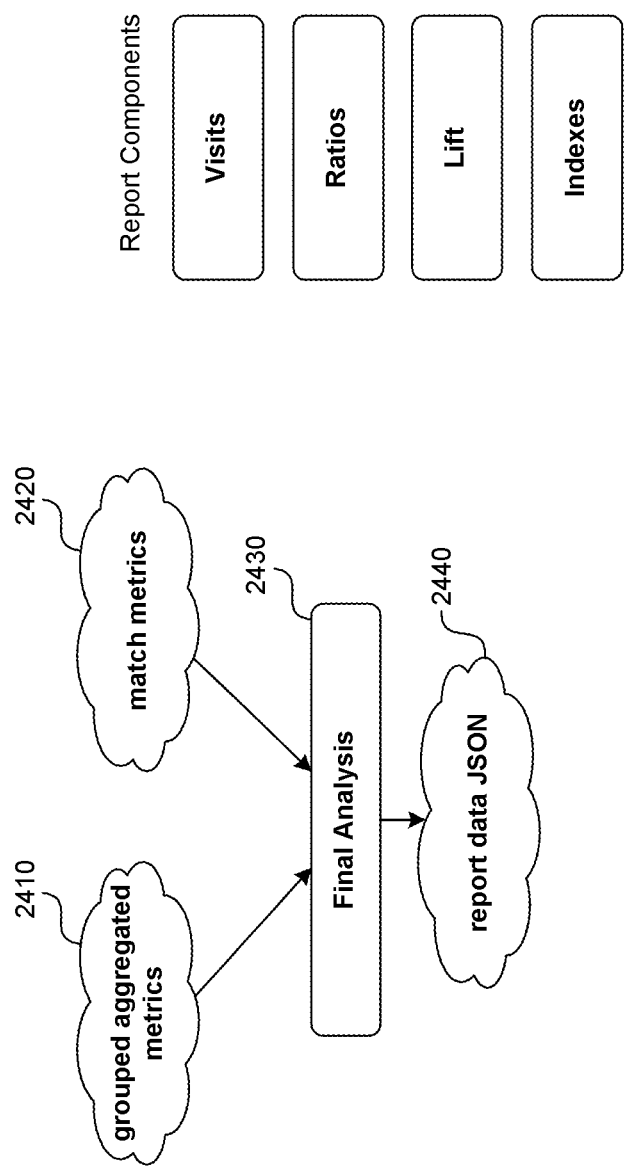
FIG. 24 is a block diagram illustrating attribution analysis in the attribution system.

FIG. 24 is a block diagram illustrating attribution analysis in the attribution system 110. The attribution analysis considers the grouped aggregated metrics 2410 and the match metrics 2420 as inputs and determines metrics 2430 associated with visits, ratios, lifts and indexes described above as outputs. The output data 2440 can be reported out in JSON or other suitable format.

Example store visit metrics, match metrics, lift metrics, revenue metrics, and index metrics that can be included in an attribution report are listed in tables 2-4 below.

TABLE 2

Store Visit Metrics From Attribution Analysis

| Store Visit Metrics | Definition |
|---|---|
| Projected store visits over x days | Cumulative projected store visits after ad exposure, where x is a window of time determined by the attribution system model |
| Store conversion rate over x days | Average number of store conversions in the impression population |
| Cost per store visit (or other defined target) | Ratio of ad spend (reported by the advertiser) to projected store visits (or other target goal) over x days |
| Impressions per store visit ratio | Ratio of impressions (reported by the advertiser) to projected store visits over x days. |
| Purchase Rate | Ratio of purchases to store visits |
| Revenue | Revenue tied to store visits |
| Lift Revenue | Revenue tied to lifted store visits |
| Return on Ad Spend (ROAS) | Ratio of revenue to ad spend |
| Lift Return on Ad Spend | Ratio of lift revenue to ad spend |

TABLE 3

Panel Match Rate Metrics

| Panel Match Rate Metrics | Definition |
|---|---|
| Panelist with ad impression | Count of Panelists exposed to campaign ad impressions |
| Panelist impressions | Cumulative campaign ad impressions across matched users |
| Impressions per panelist | Ratio of panelist impressions to panelist with ad impression |

TABLE 4

Lift Metrics

| Lift Metrics | Definition |
|---|---|
| Confidence | A measure of the confidence that the lift is greater than zero |
| Lift | Measured difference in store visits based on targeting and ad exposure compared against baseline for panelists |

TABLE 4-continued

Lift Metrics

| Lift Metrics | Definition |
|---|---|
| Projected lift visits | The projected incremental store visits derived from the lift estimate |
| Cost per lift store visit (or other defined target) | Ratio of ad spend to projected lift visits |
| Impressions per lift store visit (or other defined target) ratio | Ratio of impressions to projected lift visits |

Following the attribution analysis, the attribution system 110 generates a report using a report template and other configuration parameters and database configurations. FIG. 25 illustrates an example attribution report generated for an ad campaign. The attribution report includes information associated with campaign metrics. For example, a count of the impressions and amount of money spent on the ads that are provided by the advertiser can be included along with the panel match metrics listed in table 3. The attribution report also includes metrics associated with store visits and lift listed in tables 2 and 4. Referring to FIG. 26A, the attribution report can also include high index demographics features associated with the ad exposure and corresponding impression and place indexes. The indexes for different demographic features provide advertisers an overview of effectiveness of their ad campaigns in targeting different segments of the population. For example, in the gender demographic feature on the attribution report, females may over index relative to males, indicating that the ad campaign was more effective in targeting females compared to males. In some embodiments, the attribution report can also provide impression indexes for different geographic regions (FIG. 26B) and different businesses (FIG. 26C).

2c. Web Service and Database

Figure 27:
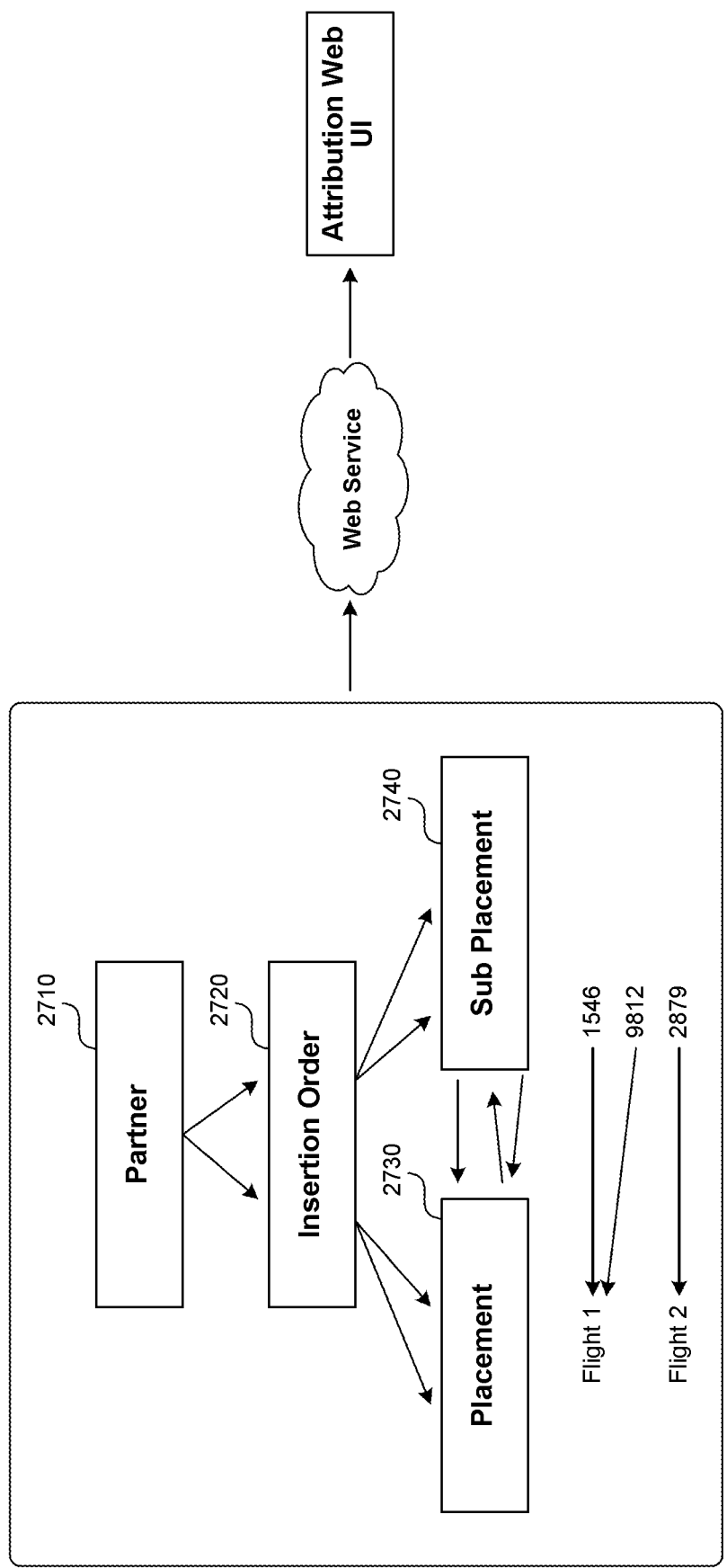
FIG. 27 is a block diagram illustrating the web service and database components of the attribution system.

FIG. 27 is a block diagram illustrating the web service and database components of the attribution system. Typically an advertiser 2710 submits an insertion order 2720 to an ad-network to schedule and authorize an ad campaign through the ad-network. The insertion order includes information related to ad placement 2730 and sub-placement 2740. The placement information identifies the specific iteration of the ad campaign (e.g., HMC's Flight 1 or HMC's Flight 2) and the sub-placement information includes information about the ad itself. The ad campaign data are provided to the attribution system via the web service. The received campaign data is loaded and displayed on the attribution web user interface (UI). An example of ad campaign data received by the attribution system and stored in a customer database is listed in table 5.

TABLE 5

Ad Campaign Data

| Data Fields | Value |
|---|---|
| Id | 3bd3cb2b-6104-402e-b7df-68664c968479 |
| Insertion Order | ff10d359-145f-45aa-bd76-58c658f01cg6 |
| Name | HMC-GoldCinemas-ABCadnetwork |
| Start date | 2013 Dec. 26 |
| End date | 2014 Feb. 14 |
| Spend | $62,175.00 |
| Impressions | 10167842 |
| Event | 16000 |
| Event type | Place |
| Status | ACTIVE |

TABLE 5-continued

Ad Campaign Data

| Data Fields | Value |
| --- | --- |
| Processing Status | IDLE |
| Last Processing Date | 2014-03-07 00:00:00 |
| Campaign Description | HMC Gold Cinemas Report |
| Conversion Description | Visits to Gold Cinemas |
| Sub Placements | 126651390, 126652950, 126656670 |

2d. Monitoring

Figure 28:
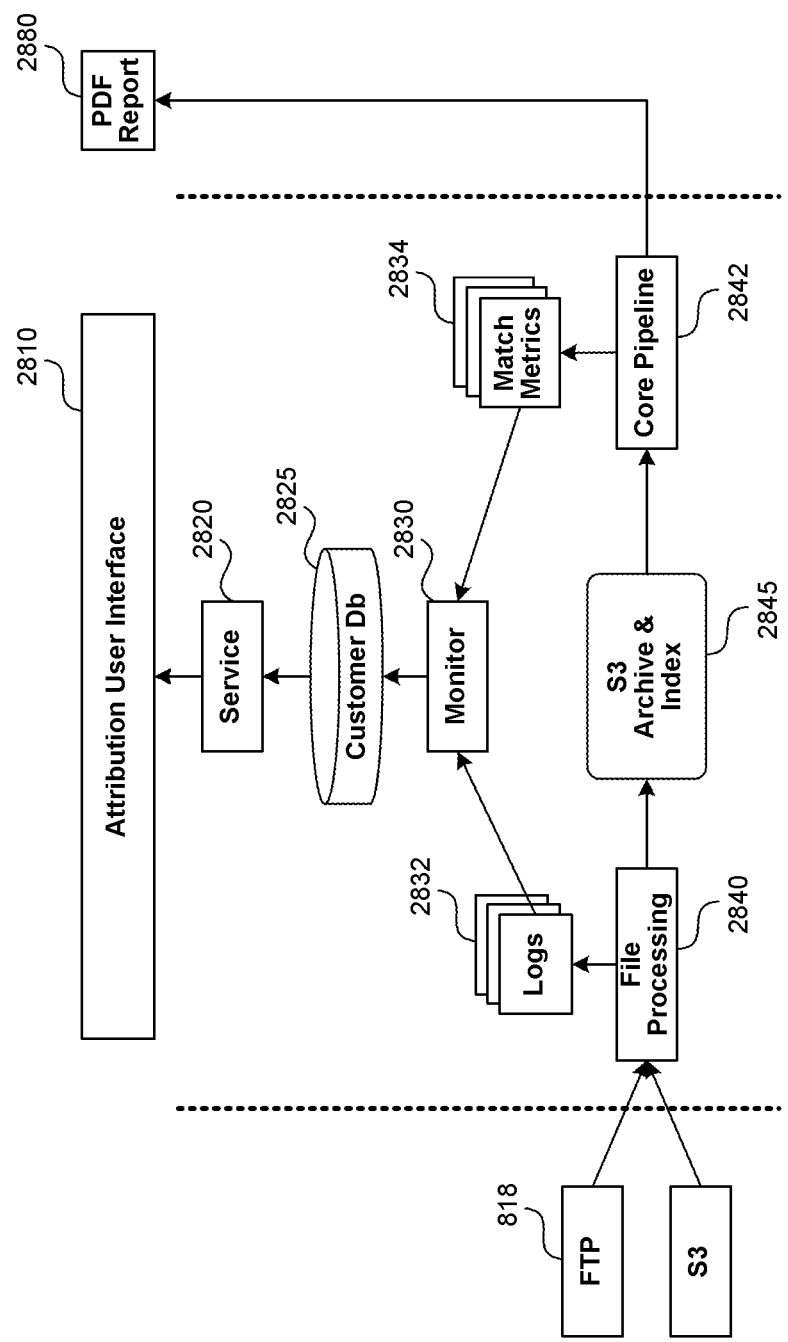
FIG. 28 is a block diagram illustrating attribution monitoring in the attribution system.

FIG. 28 is a block diagram illustrating attribution monitoring in the attribution system 110. As previously described, the impression data from ad-networks are uploaded to the FTP server 818 as illustrated in FIG. 28, and also referred to as the FTP server 815 in FIGS. 8, 11, and 12), and cloud-based storage or other file storage services. The attribution system initiates file processing 2840 to archive and index 2845 the impression data and generates logs 2832 when the archiving and indexing are completed. The core pipeline retrieves the archived and indexed impression data to determine match metrics 2834 and other aggregated metrics and generate a report 2880 (e.g., PDF report). The monitor 2830 monitors both the logs from the file processing and the match and other metrics from the core pipeline 2842 to update the customer database 2825 that stores the metrics and to generate alerts. When a customer logs in to the attribution system via the attribution user interface 2810, the attribution system, via a service 2820, uses an identifier associated with the customer to retrieve from the customer database various performance metrics and other data associated with an ad campaign associated with the customer for display on the attribution user interface.

3. Data Flow Through the Attribution System

Figure 29:
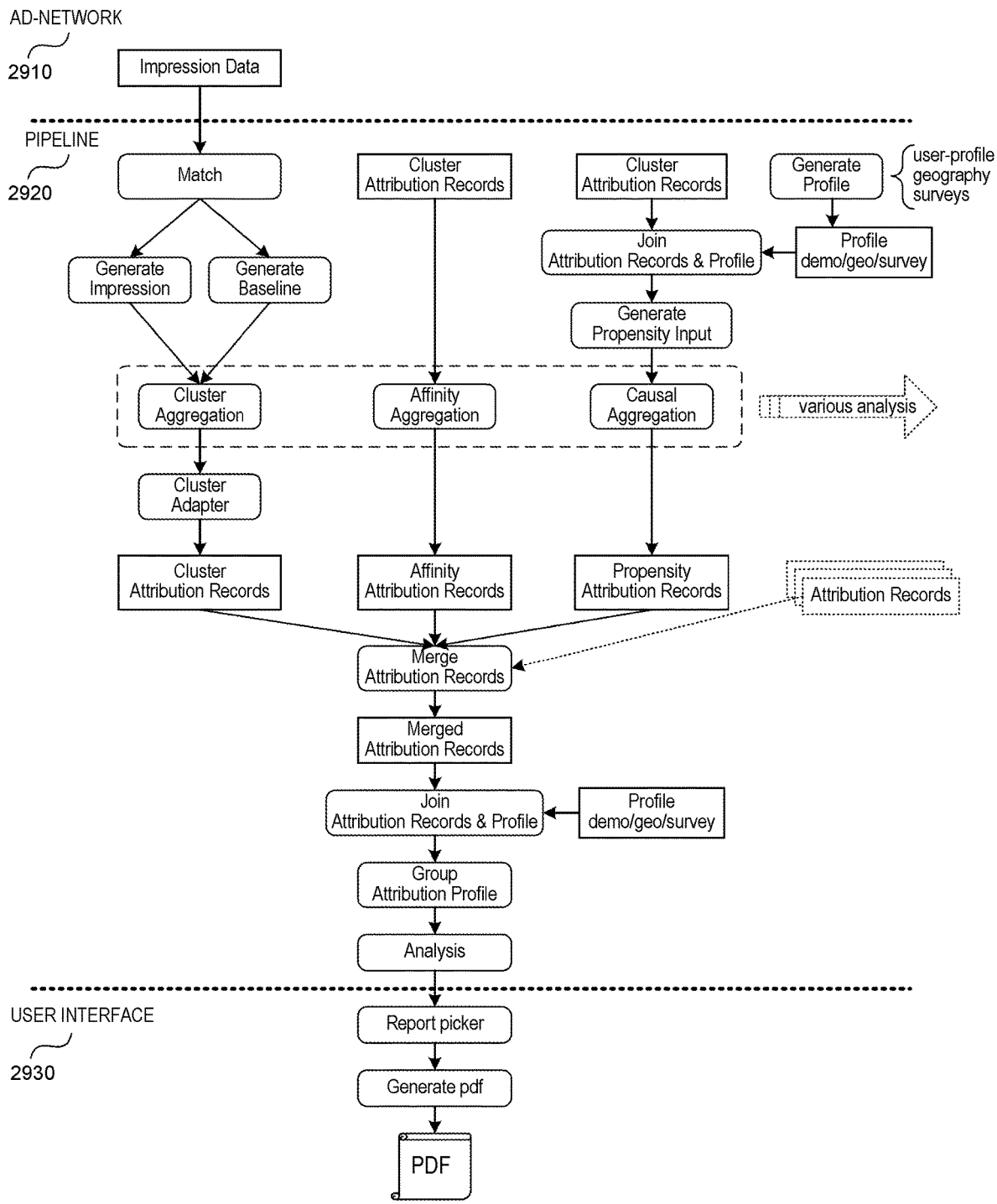
FIG. 29 is a block diagram illustrating a process of performing attribution analysis to generate an attribution report.

FIG. 29 is a block diagram illustrating the overall process of performing attribution analysis to generate an attribution report. An ad-network 2910 provides impression data associated with an ad campaign to the attribution system's core pipeline 2920. Typically, the ad-network is a third-party separate from the attribution system. However, in some embodiments, the impression data can be collected by an agent of the attribution system. In some other embodiments, the impression data can be derived from both third-party ad-networks and the agent of the attribution system.

In some embodiments, the impression data has been discussed in the context of ads to mobile devices. However, impression data is not limited to ads to mobile devices and may include or be associated with ad impressions for ads and/or other media (e.g., product reviews, social media) delivered to users through other media channels, for example, desktops, tablets, televisions, radio, print, billboard, or the like, to devices other than mobile devices. For example, a user's media consumption on a desktop computer, a laptop computer, or other devices may be measured and associated with a user or device identifier for attribution analysis.

The core pipeline receives the impression data and matches hashed device identifiers associated with users who received the impression against hashed device identifiers of the panelists of the attribution system to identify panelists who received the impression as impression users and panelists who did not receive the impression as baseline (if the control group is not provided by the advertiser). As described previously, panelists of the attribution system are users who have an agent or client installed on their mobile devices to report location and other observation data to an inference pipeline. The inference pipeline analyses location clusters to generate candidate places potentially visited by the users and probabilities of the visits to those candidate places. Based on the matching, the core pipeline generates impressions for the impression users and impressions for the baseline users.

The core pipeline uses the impressions associated with the impression and baseline users to perform cluster aggregation to determine visit metrics of the impression and baseline users. The visit metrics are stored in association with corresponding user, timestamp, population and profile in the cluster attribution records. The data in the cluster attribution records are utilized to perform various other analyses. For example, the core pipeline utilizes data in the cluster attribution records to perform affinity aggregation to generate affinity index. Similarly, the core pipeline utilizes the data in the cluster attribution record to generate merged profile which associates user profile, geography and surveys. The core pipeline then joins the cluster attribution records and the profile and uses that information to generate propensity input for a propensity model. The propensity input in some embodiments can be visits and demographics associated with impression users and baseline users. Demographics can include, for example, age, geography and/or other attributes.

The core pipeline then performs causal aggregation by feeding the merged profiles into a propensity model. The propensity model utilizes the propensity input data to generate a propensity score that weights the baseline users so that the demographic, geographic and/or other behavioral characteristics of the baseline users match those of the impression users. The propensity model is combined with an outcome model to obtain doubly robust estimate, though any number of propensity modeling techniques may be used. The outputs from the causal analysis are aggregated across the various aggregation dimensions (e.g., demographics, geography) to determine count, sum, sum of squares and non-zero count and stored as propensity attribution records. The cluster, affinity, causal and/or other attribution records are merged together to obtain merged attribution records. The core pipeline then uses demography, geography and survey associated with profiles to obtain group attribution profile.

The core pipeline then performs an attribution analysis to determine the performance metrics including visit metrics, lift metrics and indexes and stores such performance metrics as report data. In some embodiments, a customer can access a user interface provided by the attribution system to pick a report associated with the ad campaign for processing. Once a report is picked up for processing, the attribution system uses the report data to generate a report or update a previously generated report and provides the report to the customer via the user interface 2930. The report can be in any suitable format such as PDF, XLS, CSV or the like.

Figure 30:
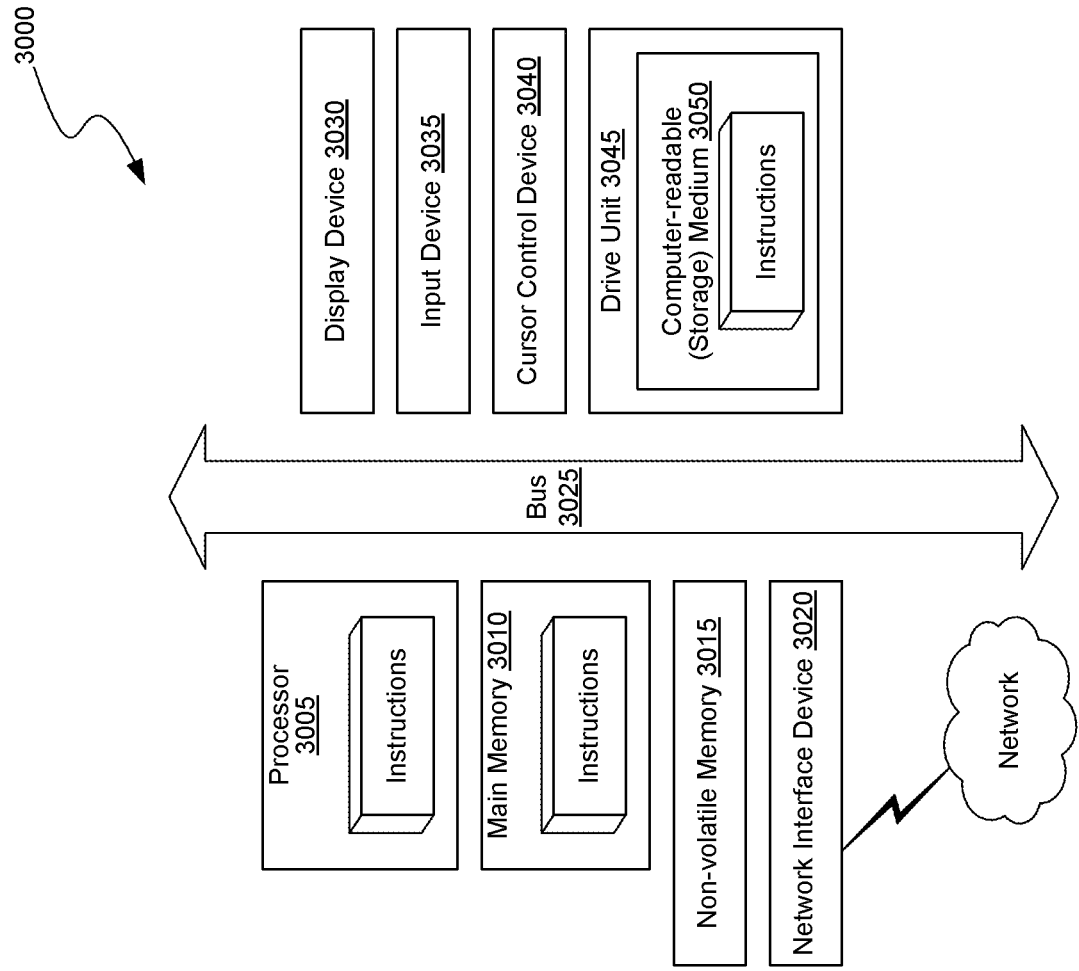
FIG. 30 shows a diagrammatic representation of a machine in the example form of a computer system within which a set of instructions, for causing the machine to perform any one or more of the methodologies discussed herein, may be executed.

FIG. 30 shows a diagrammatic representation of a machine in the example form of a computer system within which a set of instructions, for causing the machine to perform any one or more of the methodologies discussed herein, may be executed.

In the example of FIG. 30, the computer system 3000 includes a processor 3005, main memory 3010, non-volatile memory 3015, and an interface device 3020. Various common components (e.g., cache memory) are omitted for illustrative simplicity. The computer system 3000 is intended to illustrate a hardware device on which any of the components depicted in the example of FIGS. 8-12 and 28 (and any other components described in this specification) can be implemented. The computer system 3000 can be of any applicable known or convenient type. The components of the computer system 3000 can be coupled together via a bus or through some other known or convenient device.

The processor 3005 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory 3010 is coupled to the processor by, for example, a bus 3025. The memory can include, by way of example but not limitation, random access memory (RAM), such as dynamic RAM (DRAM) and static RAM (SRAM). The memory can be local, remote, or distributed.

The bus 3025 also couples the processor to the non-volatile memory 3015 and drive unit 3045. The non-volatile memory 3015 is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 3000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium 3050." A processor is considered to be "configured to execute a program" when at least one value associated with the program is stored in a register readable by the processor.

The bus 3025 also couples the processor to the network interface device 3020. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input 3035 and/or output devices. The I/O devices can include, by way of example but not limitation, a keyboard, a mouse or other pointing device 3040, disk drives, printers, a scanner, and other input and/or output devices, including a display device 3030. The display device can include, by way of example but not limitation, a cathode ray tube (CRT), liquid crystal display (LCD), or some other applicable known or convenient display device. For simplicity, it is assumed that controllers of any devices not depicted in the example of FIG. 30 reside in the interface.

In operation, the computer system 3000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments of the attribution system have been described herein for purposes of illustration, but that various modifications may be made without deviating from the spirit and scope of the embodiments. Accordingly, the embodiments are not limited except as by the appended claims.

We claim:

1. A computer-implemented method of analyzing an impact of a campaign on visitation behavior associated with a location, the method comprising:
providing a graphical user interface for displaying campaign data;
generating an alert to indicate that impression data is available for processing using a core pipeline, wherein the core pipeline comprises: a server API, a user profile, and a place service, and wherein the core pipeline is operable to:
   receive a web service query comprising report configuration parameters; and
   based upon the report configuration parameters, retrieving the impression data;
in response to generation of the alert, accessing, via the core pipeline, impression data for an impression population of impression users, wherein the impression data comprises user identifiers of the impression users exposed to media relating to the campaign;
generating a set of baseline user data based on the location, wherein the baseline user data comprises raw location and device sensor readings used to determine a set of baseline uses who visited the location, and wherein the baseline users have not been exposed to the media relating to the campaign;
generating user identifiers for baseline users in the set of baseline user data;
generating a baseline conversation rate for the baseline users;
hashing the user identifiers of the baseline users to protect a privacy of the baseline population;
hashing the user identifiers of the impression users to protect a privacy of the impression population;
performing a comparison of the hashed baseline user identifiers against the hashed impression user identifiers to identify a first set of hashed user identifiers, the first set of hashed user identifiers including user identifiers that are among both the hashed baseline user identifiers and the hashed impression user identifiers;
identifying a second set of hashed user identifiers, the second set comprising hashed user identifiers that are not among the first set of hashed user identifiers or the hashed impression users;
determining, based on one or more analyses that include a lift analysis of the second set and the first set, a conversion rate of the media relating to the campaign;
upon determining the conversion rate of the media, updating the user interface to present the conversion rate of the media, campaign data, and demographic data included as part of an updated attribution report generated for the campaign.

2. The method of claim 1, wherein the determining the conversion rate of the media includes determining the conversion rate of the media during a window of time.

3. The method of claim 2, wherein the window of time is relative to the media consumption by a user.

4. The method of claim 1, wherein the user identifiers of the baseline users and the user identifiers of the impression users comprise device identifiers.

5. The method of claim 1, wherein the impression data further comprises a media identifier that identifies attributes of the media relating to the campaign, and a timestamp that indicates when the media relating to the campaign was consumed.

6. The method of claim 1, wherein the method further comprises:
   monitoring a source database;
   detecting the impression data within the source database; and
   accessing the impression data at the source database in response to the detecting the impression data within the source database.

7. The method of claim 1, further comprising:
   identifying, from the user identifiers of the impression users, a first group of users associated with a demographic feature;
   identifying, from the user identifiers of the baseline users, a second group of users associated with the demographic feature; and
   calculating an impression index for the demographic feature based on a difference between the user identifiers of the impression users and the user identifiers of the baseline users.

8. A non-transitory computer-readable storage medium whose contents, when executed by a computing device, cause the computing device to perform operations for attributing a conversion event to a campaign associated with a location, the operations comprising:
   generating an alert to indicate that impression data is available for processing using a core pipeline, wherein the core pipeline comprises: a server API, a user profile, and a place service, and wherein the core pipeline is operable to:
      receive a web service query comprising report configuration parameters; and
      based upon the report configuration parameters, retrieving the impression data;
   in response to generation of the alert, accessing, via the core pipeline, impression data for an impression population of impression users, wherein the impression data comprises user identifiers of the impression users exposed to media relating to the campaign;
   generating a set of baseline user data based on the location, wherein the baseline user data comprises raw location and device sensor readings used to determine a set of baseline uses who visited the location, and wherein the baseline users have not been exposed to the media relating to the campaign;
   generating user identifiers for baseline users in the set of baseline user data;
   generating a baseline conversation rate for the baseline users;
   generating a baseline conversation rate for the baseline users;
   hashing the user identifiers of the baseline users to protect a privacy of the baseline population;
   hashing the user identifiers of the impression users to protect a privacy of the impression population;
   performing a comparison of the hashed baseline user identifiers against the hashed impression user identifiers to identify a first set of hashed user identifiers, the first set of hashed user identifiers including user identifiers that are among both the hashed baseline user identifiers and the hashed impression user identifiers;
   identifying a second set of hashed user identifiers, the second set comprising hashed user identifiers that are not among the first set of hashed user identifiers or the hashed impression users;
   determining, based on one or more analyses that include a lift analysis of the second set and the first set, a conversion rate of the media relating to the campaign; and
   presenting the conversion rate of the media within an updated report, the updated report including a display of an amount of money spent on the campaign, and a count that indicates a number of user identifiers among the first set of user identifiers.

9. An attribution system, comprising:
a memory; and
at least one hardware processor coupled to the memory and comprising instructions that causes the system to perform operations comprising:
   generating an alert to indicate that impression data is available for processing using a core pipeline, wherein the core pipeline comprises: a server API, a user profile, and a place service, and wherein the core pipeline is operable to:
      receive a web service query comprising report configuration parameters; and
      based upon the report configuration parameters, retrieving the impression data;
   in response to generation of the alert, accessing, via the core pipeline, impression data for an impression population of impression users, wherein the impression data comprises user identifiers of the impression users exposed to media relating to the campaign;
   generating a set of baseline user data based on the location, wherein the baseline user data comprises raw location and device sensor readings used to determine a set of baseline uses who visited the location, and wherein the baseline users have not been exposed to the media relating to the campaign;
   generating user identifiers for baseline users in the set of baseline user data; generating a baseline conversation rate for the baseline users;
   generating a baseline conversation rate for the baseline users;
   hashing the user identifiers of the baseline users to protect a privacy of the baseline population;
   hashing the user identifiers of the impression users to protect a privacy of the impression population;
   performing a comparison of the hashed baseline user identifiers against the hashed impression user identifiers to identify a first set of hashed user identifiers, the first set of hashed user identifiers including user identifiers that are among both the hashed baseline user identifiers and the hashed impression user identifiers;
   identifying a second set of hashed user identifiers, the second set comprising hashed user identifiers that are not among the first set of hashed user identifiers or the hashed impression users;
   determining, based on one or more analyses that include a lift analysis of the second set and the first set, a conversion rate of the media relating to the campaign; and
   presenting the conversion rate of the media within an updated report, the updated report including a display of an amount of money spent on the campaign, and a count that indicates a number of user identifiers among the first set of user identifiers.

* * * * *